(12) United States Patent
Iwasawa et al.

(10) Patent No.: US 10,935,772 B2
(45) Date of Patent: Mar. 2, 2021

(54) ZOOM LENS AND IMAGING APPARATUS

(71) Applicant: Tamron Co., Ltd., Saitama (JP)

(72) Inventors: Yoshito Iwasawa, Saitama (JP);
Hisayuki Yamanaka, Saitama (JP);
Keisuke Okada, Saitama (JP); Junichi Yamazoe, Saitama (JP)

(73) Assignee: Tamron Co., Ltd., Saitama (JP)

( * ) Notice: Subject to any disclaimer, the term of this patent is extended or adjusted under 35 U.S.C. 154(b) by 109 days.

(21) Appl. No.: 16/222,268

(22) Filed: Dec. 17, 2018

(65) Prior Publication Data
US 2019/0302432 A1    Oct. 3, 2019

(30) Foreign Application Priority Data

Mar. 30, 2018 (JP) ............................. JP2018-066872

(51) Int. Cl.
*G02B 15/17* (2006.01)
*G02B 15/177* (2006.01)
*G02B 13/18* (2006.01)
*G02B 27/64* (2006.01)

(52) U.S. Cl.
CPC ........... *G02B 15/177* (2013.01); *G02B 13/18* (2013.01); *G02B 27/646* (2013.01)

(58) Field of Classification Search
CPC ..... G02B 15/177; G02B 13/18; G02B 27/646
See application file for complete search history.

(56) References Cited

U.S. PATENT DOCUMENTS

| 2007/0297067 | A1 | 12/2007 | Muramatsu et al. | |
| 2018/0307012 | A1* | 10/2018 | Machida | ................ G02B 13/04 |
| 2019/0187409 | A1* | 6/2019 | Noda | ..................... G02B 13/06 |

FOREIGN PATENT DOCUMENTS

JP              20083195 A       1/2008

* cited by examiner

*Primary Examiner* — Wen Huang
(74) *Attorney, Agent, or Firm* — The Webb Law Firm

(57) ABSTRACT

A zoom lens including a front group and a rear group, wherein a lens group arranged on an object side of a widest air interval at a wide-angle end is defined as the front group and a lens group arranged on an image side of the widest air interval at the wide-angle end is defined as the rear group, the front group having a negative refractive power, the rear group having a positive refractive power. Changing focal length from the wide-angle end to the telephoto end is performed by changing an air interval between the lens groups.

24 Claims, 12 Drawing Sheets

ZOOM LENS AND IMAGING APPARATUS

CROSS-REFERENCE TO RELATED APPLICATION

This application claims priority to Japanese Patent Application No. 2018-066872 filed Mar. 30, 2018, the disclosure of which is hereby incorporated in its entirety by reference.

BACKGROUND OF THE INVENTION

Field of the Invention

The present invention relates to a zoom lens and an imaging apparatus, and in particular to a zoom lens suitable for an imaging apparatus that uses a solid state image sensor (CCD, CMOS, etc.) such as a digital still camera, a digital video camera, and the like and to the imaging apparatus including the zoom lens.

Description of the Related Art

Imaging apparatuses using solid-state image sensor such as digital still cameras, digital video cameras, single-lens reflex cameras, mirrorless interchangeable-lens cameras, and the like have been traditionally widely used. These imaging apparatuses often use imaging lenses which are called standard zoom lens. The term "standard zoom lens" generally refers to a zoom lens which includes a focal length of 50 millimeters in the zoom range in terms of 35-mm format.

For example, Japanese Patent Laid-Open No. 2008-3195 proposes a standard zoom lens composed of the first lens group having a positive refractive power, the second lens group having a negative refractive power, the third lens group having a positive refractive power, and the fourth lens group having a positive refractive power in order from the object side. According to the proposed zoom lens, the second lens group is moved toward the object side for focusing on an object.

However, in the zoom lens disclosed in Japanese Patent Laid-Open No. 2008-3195, the second lens group responsible for the major part of the zooming serves as the focus group. The second lens group includes many lenses and is heavy when compared with the other lens groups. As a result, it is difficult to perform quick auto-focusing. Also, since the second lens group is heavy, the driving mechanism to move the second lens group at the time of focusing becomes large in size. Consequently, the problem which it entails is increased in the size and weight of the lens unit including the lens barrel.

Also, trends in recent years indicate that at least one lens belonging to the optical system is defined as a vibration-proof group, and an image is shifted by moving the vibration-proof group in a direction generally perpendicular to the optical axis when an image blur occurs due to a hand-shake etc. at the time of imaging. When such a vibration proof mechanism is to be incorporated in a zoom lens, it is necessary to arrange a driving mechanism in the lens barrel for moving the vibration-proof group in the direction generally perpendicular to the optical axis in the lens barrel. As a result, in the context of reduction in the size and weight of the zoom lens unit, the positional relationship between the focus group and the vibration-proof group, as well as reduction in the size and weight of the vibration-proof group, is of importance.

SUMMARY OF THE INVENTION

In view of the above, an object side of the present invention is to provide a small-sized standard zoom lens having a high optical performance while reducing the weight of a focus group and a vibration-proof group, and an imaging apparatus including the zoom lens.

In order to solve the above-described problem and achieve the above-identified object, the zoom lens according to the present invention is composed of a front group and a rear group, where a group including at least one lens group arranged on an object side of a widest air interval at a wide-angle end is defined as the front group and a group including at least one lens group arranged on an image side of the widest air interval at the wide-angle end is defined as the rear group. The front group has a negative refractive power, the rear group has a positive refractive power. The zoom lens is configured to change focal length from the wide-angle end to a telephoto end by changing an air interval between the lens groups such that at least an air interval between the front group and the rear group is reduced. The zoom lens further includes a focus group arranged in the rear group and configured to move in a direction along an optical axis at the time of focusing from infinity to a close object and a vibration-proof group arranged to be closer to the object side than the focus group and configured to be movable in a direction generally perpendicular to the optical axis.

The zoom lens satisfies the following conditional expressions:

$$3.80 < Cr1f/fw \quad (1)$$

$$0.50 < (-ffw + Dfrw)/FBw < 2.00 \quad (2)$$

where
Cr1f denotes a radius of curvature of the surface closest to the object side of the zoom lens,
fw denotes a focal length of the zoom lens at the wide-angle end,
ffw denotes a composite focal length of the front group at the wide-angle end,
Dfrw denotes a distance on an optical axis between the surface closest to the image side of the front group and the surface closest to the object side of the rear group at the wide-angle end, and
FBw denotes an air conversion length from the surface closest to the image side of the zoom lens to an image forming plane at the wide-angle end.

Also, in order to solve the above-described problem and achieve the above-identified object, the imaging apparatus according to the present invention is characterized by the fact that it includes the above-described zoom lens according to the present invention, and an image sensor, on the image side of the zoom lens, configured to convert the optical image formed by the zoom lens into an electrical signal.

According to the present invention, it is made possible to provide a standard zoom lens having a high optical performance while reducing the weight of a focus group, and an imaging apparatus including the zoom lens.

DETAILED DESCRIPTION OF THE PREFERRED EMBODIMENTS

Figure 1:
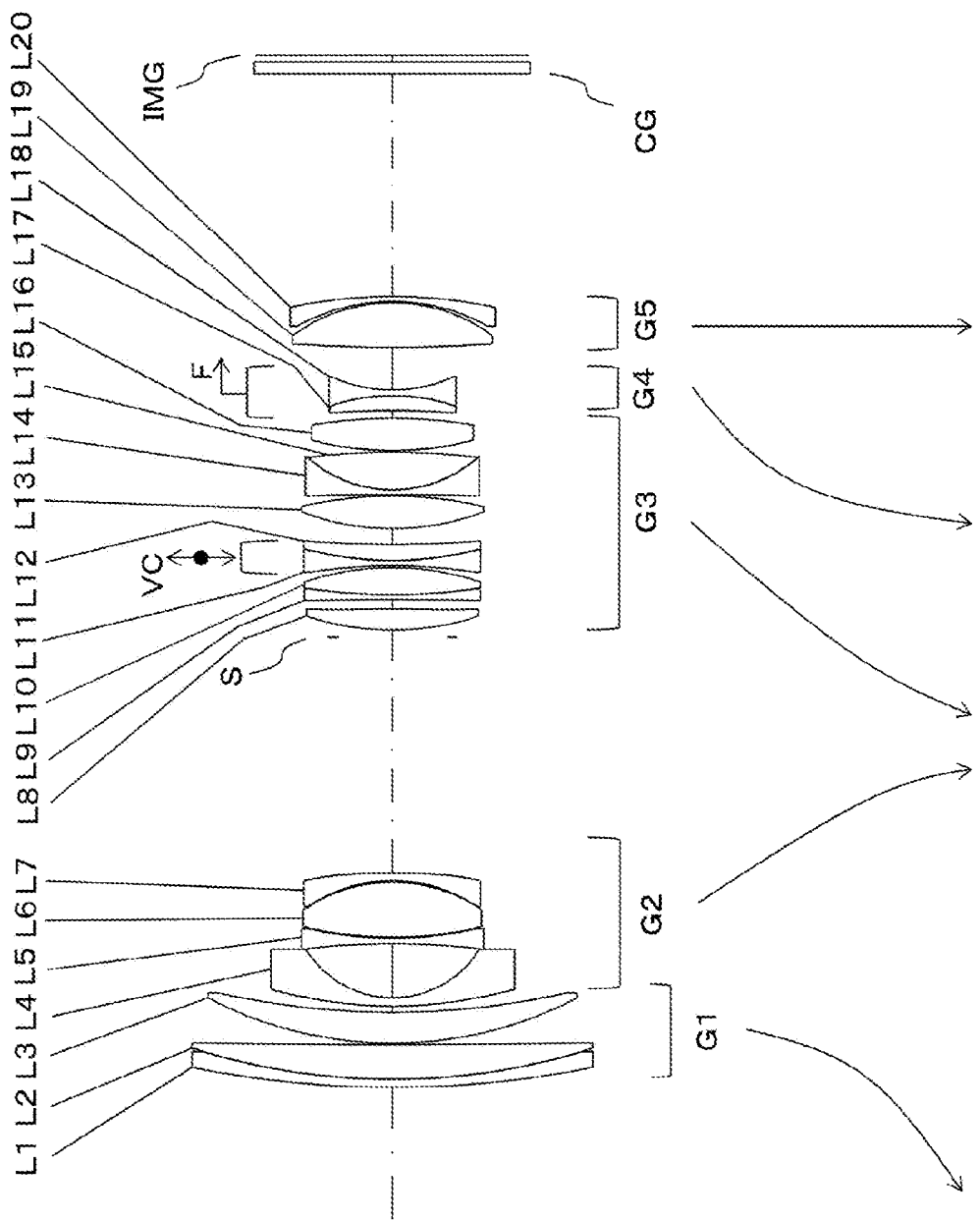
FIG. 1 is a cross-sectional view illustrating an example lens construction of a zoom lens of Example 1 of the present invention at the time of focusing on infinity at a wide-angle end.

An embodiment of a zoom lens and an imaging apparatus according to the present invention will be described below. Note that the zoom lens and the imaging apparatus which will be described hereinbelow only pertain to the possible modes of implementation of the zoom lens and the imaging apparatus according to the present invention. Accordingly, the zoom lens and the imaging apparatus according to the present invention are in no way limited to the embodiment which will be described hereinbelow.

1. Zoom Lens
1-1. Optical Construction of the Zoom Lens

The description of this embodiment begins with the illustration of the optical construction of the zoom lens in accordance with this embodiment. In the context of description of the zoom lens in accordance with this embodiment, let us assume here that a group including at least one lens group arranged on an object side of a widest air interval at a wide-angle end is defined as a front group and another group including at least one lens group arranged on an image side of the widest air interval at the wide-angle end is defined as a rear group. The front group has a negative refractive power and the rear group has a positive refractive power. The air interval between the lens groups is changed such that at least an air interval between the front group and the rear group is reduced at the time of changing focal length from the wide-angle end to a telephoto end. Also, the zoom lens includes a focus group configured to move in a direction along an optical axis at a time of focusing from infinity to a close object; and a vibration-proof group arranged to be closer to the object side than the focus group and configured to be movable in a direction generally perpendicular to the optical axis. The focus group is arranged in the rear group.

The zoom lens adopts a retrofocus type power arrangement in which the front group has a divergence effect and the rear group has a convergence effect, where the front group is arranged on the object side of the widest air interval at the wide-angle and the rear group is arranged on the image side of the widest air interval at the wide-angle end. As a result, widening of an image viewing angle at the wide-angle end as well as suppression of increase in the size of the zoom lens is facilitated. That is, since the zoom lens adopts the power arrangement suitable for a standard zoom lens, it is made possible to achieve a wide image viewing angle at the wide-angle end, ensure a backfocus suitable for an interchangeable lens system such as a single-lens reflex camera, and construct a small-sized device. Note that the zoom lens has a half image viewing angle ($\omega$) at the wide-angle end being larger than 24° while including a focal length of 50 millimeters in the zoom range in terms of 35-mm format.

In the zoom lens, a negative refractive power is arranged in the front group, a positive refractive power is arranged in the rear group, and the air interval between the front group and the rear group is reduced at the time of changing focal length from the wide-angle end to the telephoto end. While an incidence angle of a light ray incident on the front group fluctuates in response to the changing focal length, the fluctuation of the incidence angle of the light ray incident on the rear group is small. As a result, image viewing angle fluctuation at the time of focusing can be suppressed by arranging the focus group in the rear group. Accordingly, the image viewing angle fluctuation becomes small also when wobbling is performed, which makes it possible to achieve a zoom lens suitable for video imaging as well.

Further, according to the zoom lens, the diameter of the incident luminous flux which is incident on the rear group is smaller than the diameter of the incident luminous flux which is incident on the front group. As a result, by arranging the focus group in the rear group, in comparison with a case where the focus group is arranged in the front group, it is made possible to provide a more compact and lightweight focus group.

Further, the zoom lens includes a vibration-proof group which is arranged to be closer to the object side than the focus group and configured to be movable in a direction generally perpendicular to the optical axis. Vibrations are transferred to the imaging apparatus at the time of imaging due to so-called a hand-shake, etc. and, when an image blur occurs, the image can be shifted by moving the vibration-proof group in the direction generally perpendicular to the optical axis. That is, it is made possible to perform the image blur correction. In the zoom lens, the focus group is arranged to be closer to the image side than the zoom lens. In view of this, by arranging the vibration-proof group closer to the object side than the focus group, a driving mechanism (which includes mechanical members, motors, electrical parts, etc. This is hereinafter referred to as "focus driving mechanism".) for moving the focus group in the direction along the optical axis and a driving mechanism (which includes mechanical members, magnets, coils, electrical parts, etc., This is hereinafter referred to as "vibration insulation driving mechanism.") for moving the vibration-proof group in a direction generally perpendicular to the optical axis can be more readily arranged in a compact manner within the lens barrel. In addition, various wiring arrangements are also facilitated and it is made possible to achieve the miniaturization of the zoom lens unit including the lens barrel of the zoom lens. In contrast, when the vibration-proof group is arranged to be closer to the image side than the focus group, some restrictions may be involved on the arrangement of the vibration-proof group in order to arrange in a compact manner the above-described focus driving mechanism and vibration insulation driving mechanism within the lens barrel, making it difficult to achieve the optical performance required, in addition to which it becomes difficult to achieve the miniaturization of the zoom lens unit. Note that the constructions of the focus driving mechanism and the vibration insulation driving mechanism are not limited to particular ones. The optical construction of the zoom lens will be described in more detail below.

(1) Widest Air interval at the Wide-Angle End

First, the air interval between the front group and the rear group will be described. The zoom lens is composed of a plurality of lens groups. The air intervals between the individual lens groups change at a time of changing focal length from the wide-angle end to the telephoto end. The length of the air intervals between the individual lens groups change depending on the zooming positions of the zoom lens. In view of this, in the context of the present invention, among the air intervals between the individual lens groups of which the zoom lens is composed, the widest air interval at the wide-angle end of the zoom lens is referred to as "the widest air interval at the wide-angle end" mentioned above.

Note that the air interval between the lens groups changing depending on the zoom positions of the zoom lens is referred to as "variable interval." Note that "the widest air interval at the wide-angle end" refers to the longest variable interval at the wide-angle end among the variable intervals between the lens group arranged to be closest to the object side and the lens groups arranged to be closest to the image side in the zoom lens, and it does not include an air interval (backfocus) between the lens group arranged to be closest to the image side and the image forming plane in the zoom lens. In addition, one or more lens groups arranged on the object side of "the widest air interval at the wide-angle end" is referred to as "front group" and one or more lens groups arranged on the image side of "the widest air interval at the wide-angle end" is referred to as "rear group."

(2) Front Group

The term "front group" as used herein generically refers to one or more lens groups arranged to be closer to the object side than the above-described "widest air interval at the wide-angle end." Since the front group has a negative refractive power, the front group has at least one lens group that has a negative refractive power.

Among the lens groups having a negative refractive power included in the front group, the lens group that has the largest negative refractive power is referred to as "negative lens group n." The front group has no specific limitation on the construction of the remaining lens groups as long as the front group has this negative lens group n and has a negative refractive power. For example, the front group may have two or more lens groups having a negative refractive power or may have one or more lens groups having a positive refractive power.

Nevertheless, the front group preferably includes a lens group having a positive refractive power arranged to be closest to the object side considering the fact that this is effective in ensuring a larger diameter of the zoom lens. In addition, in order to ensure a higher magnification of the zoom lens, it is effective to arrange, in the front group, a lens group having a negative refractive power on the image side of the lens group having the positive refractive power.

(3) Rear Group

The term "rear group" as used herein refers generically to one or more lens groups arranged to be closer to the image side than the above-described "widest air interval at the wide-angle end." Since the rear group has a positive refractive power, the rear group has at least one lens group having a positive refractive power. The rear group has no limitation on the construction of the remaining lens groups as long as it includes the above-described focus group and has a positive refractive power. For example, it may have two or more lens groups having a positive refractive power or may have one or more lens groups having a negative refractive power. Also, it is preferable in view of higher magnification and larger diameter to arrange a lens group having a positive refractive power closest to the object side in the rear group so as to achieve miniaturization of the zoom lens but this point does not constitute any particular limitation thereof.

The rear group preferably has at least one lens on the image side of the focus group. By arranging at least one lens on the image side of the focus group, it is made easier to correct, on the image side of the focus group, the aberration fluctuation due to the movement of the focus group at the time of focusing. Note that the refractive power of the lens may be positive, but the lens preferably has at least one lens surface Sr having a negative refractive power. When the lens having at least one lens surface Sr is arranged on the image side of the focus group, it is made easier to reduce the field curvature.

Also, the rear group preferably has at least one lens Lrn having a negative refractive power on the object side of the focus group. When the lens Lrn having a negative refractive power is arranged to be closer to the object side than the focus group, it is made possible to reduce the field curvature and facilitate the reduction of the chromatic aberration. In addition to this, it is made possible to reduce, by the lens Lrn, the aberration occurring in the focus group. As a result, the amount of aberration generated which should be corrected at the time of focusing is small, it is made easier to achieve a zoom lens having a high optical performance over the entire focusing area.

(4) Focus Group

The focus group is any one of the lens groups, or part of it, of which the rear group is composed. The construction of the focus group is not limited to a particular one but, for the reason explained below, the focus group is preferably composed of one single lens unit. Note that the term "single lens unit" as used herein refers to a single lens or a lens unit such as a cemented lens obtained by integrating multiple single lenses without any air interval in between. That is, the single lens unit is configured such that only the surface closest to the object side and the surface closest to the image side are in contact with air while the other surfaces are not in contact with air even when it has multiple optical surfaces. Also, the single lens may be a spherical lens or an aspherical lens throughout the present specification. Also, the aspherical lens may include so-called complex aspherical lens with an aspherical film adhered on its surface.

When the focus group is composed of the above-described one single lens unit, the focus group does not include an air interval. As a result, in comparison with a construction in which the focus group is composed of multiple single lenses that are arranged with the air interval in between, the zoom lens makes it possible to provide a more compact and lightweight focus group. As a result of this, it is made possible to achieve miniaturization of the various mechanical members, motors, electrical parts, and the like of which the focus driving mechanism is composed, and achieve reduction in the weight of the focus driving mechanism.

Also, in comparison with a focus group configured by arranging multiple single lenses with air interval in between, various manufacturing errors such as decentering errors and errors in air interval between single lenses can be reduced by configuring the focus group by the above-describe one single lens unit. As a result, it is made possible to reduce the deterioration of the optical performance caused by manufacturing errors and reduce the variation in the performance among individual products. Accordingly, the zoom lens with high optical performance can be manufactured with high yield.

Further, the focus group preferably has a negative refractive power. That is, the composite refractive power of the single lens unit is preferably negative. When the focus group has a negative refractive power, field curvature and distortion aberration occurring in the front group having a negative refractive power can be offset by the focus group. As a result, it is made possible to obtain a zoom lens having a high optical performance.

Note that the focus group may be composed of one single lens unit, one single lens or one cemented lens which is integrated by cementing multiple single lenses. In either case, the series of effects described above can be obtained. In comparison with a case where the focus group composed of a cemented lens, the focus group composed of one single lens can be made more compact and lightweight.

Meanwhile, when the focus group is composed of a cemented lens, it is made possible to achieve a higher performance of optical performance in comparison with a case where the focus group is composed of one single lens. For example, when the focus group is composed of cemented lens that includes a lens having a positive refractive power (lens Lp) and a lens having a negative refractive power (lens Ln), it is made possible to suppress the occurrence of chromatic aberration at the time of focusing on a close object and implement a zoom lens having a higher optical performance.

Note that when the focus group is composed of the above-described cemented lens, the order of arrangement of the lens Lp and lens Ln is not limited to a particular one but the cemented lens is preferably composed of the above-described lens Lp and the above-described lens Ln which are cemented in this order. As described above, the focus group is arranged in the rear group. In this case, in comparison with an on-axis ray, an out-of-axis ray passes more peripheral portion of the single lens unit of which the focus group is composed. This is because, in order to correct the magnification chromatic aberration in a more excellent manner, it is preferable to arrange a lens having a negative refractive power on the image side.

(5) Aperture Stop

In accordance with the zoom lens of this embodiment, the arrangement of the aperture stop is not limited to a particular one. Note that the term "aperture stop" as used herein refers to an aperture stop that defines the luminous flux diameter of the zoom lens, i.e., an aperture stop that defines the Fno of the zoom lens.

Nevertheless, it is preferable to arrange the aperture stop on the object side of the rear group or within the rear group so as to obtain an excellent optical performance over the entire focusing area. As described above, the fluctuation of the diameter of the incident luminous flux that is incident on the rear group is small. As a result, when the aperture stop is arranged on the object side of the rear group or within the rear group, it is made possible to suppress the aberration fluctuation at the time of focusing.

(6) Vibration-Proof Group

The vibration-proof group is arranged to be closer to the object side than the focus group. As a result, as described above, it is made easier to arrange the individual driving mechanisms within the lens barrel in a compact manner, in addition to which various wiring arrangements are also facilitated, and it is made possible to achieve the miniaturization of the zoom lens unit.

In accordance with the zoom lens, it suffices that the vibration-proof group is arranged to be closer to the object side than the focus group. Accordingly, the vibration-proof group may be arranged in the front group and may be arranged in the rear group. However, as described above, in accordance with the zoom lens, the diameter of the incident luminous flux that is incident on the rear group is smaller than the diameter of the incident luminous flux that is incident on the front group. As a result, by arranging the vibration-proof group in the rear group, in comparison with a case where the vibration-proof group is arranged in the front group, it is made possible to achieve miniaturization of the vibration-proof group and reduction in the weight.

Also, it is more preferable that the vibration-proof group is arranged to be closer to the image side than the aperture stop. In the region between the aperture stop and the focus group, the fluctuation in the light ray height at the time of changing focal length is small, and also the aberration fluctuation at the time of changing focal length is small. As a result, by arranging the vibration-proof group between the aperture stop and the focus group, it is made possible to reduce the aberration fluctuation at the time of the image blur correction (at the time of the vibration insulation). Hence, it is made possible to implement a zoom lens having a high performance with a smaller aberration fluctuation at the time of the vibration insulation over an entire zoom range.

The vibration-proof group may be composed of one lens or multiple lenses. In view of the suppression of the aberration fluctuation at the time of the vibration insulation, it is preferable that the vibration-proof group is composed of multiple lenses. In particular, it is preferable that the vibration-proof group is composed of at least one lens Lvcn having a negative refractive power and at least one lens Lvcp having a positive refractive power in view of suppression of the occurrence of the chromatic aberration at the time of the vibration insulation and implementation of a zoom lens having a higher optical performance.

Also, the vibration-proof group is preferably composed of one lens Lvcn having a negative refractive power and one lens Lvcp having a positive refractive power. Since the vibration-proof group is composed of two lenses (one positive lens and one negative lens), it is made possible to suppress the occurrence of the chromatic aberration at the time of the vibration insulation and achieve miniaturization and reduction in the weight of the vibration-proof group. As a result of this, it is made possible to achieve miniaturization and reduction in weight of the vibration insulation driving mechanism and achieve miniaturization of the zoom lens unit and the reduction in the weight of it.

Note that the vibration-proof group is preferably composed of a cemented lens obtained by cementing the above-described lens Lvcn and the above-described lens Lvcp with each other. In this case, the vibration-proof group does not include an air interval. As a result, for example, in comparison with a case where it has a construction in which the above-described lens Lvcn and the above-described lens Lvcp are arranged with an air interval in between, the zoom lens makes it possible to achieve miniaturization and reduction in weight of the vibration-proof group.

Also, in comparison with a case where the vibration-proof group has a construction in which the above-described lens Lvcn and the above-described lens Lvcp are arranged with an air interval in between, since the vibration-proof group is composed of one single lens unit cementing the above-described lens Lvcn and the above-described lens Lvcp, it is made possible to reduce various manufacturing errors such as decentering errors and errors in air interval between lenses. As a result, it is made possible to reduce the deterioration of the optical performance caused by manufacturing errors and reduce the variation in the performance among individual products. Accordingly, the zoom lens with high optical performance can be manufactured with high yield.

Further, it is preferable that the vibration-proof group has at least one aspherical surface. When the vibration-proof group has at least one aspherical surface, it is made possible to suppress the amount of generation of the comatic aberration at the time of the vibration insulation. As a result, since the vibration-proof group can be composed of a small number of lenses and with a small amount of aberration generated, it is made possible to achieve the miniaturization and reduction in the weight of the vibration-proof group. It is made possible to implement a zoom lens having a high optical performance and achieve miniaturization and reduction in the weight of the vibration-proof group, and achieve miniaturization and reduction in the weight of the vibration insulation driving mechanism.

Also, the above-described aspherical surface preferably has an aspherical shape such that the refractive power is weaker than the refractive power obtained from its paraxial curvature. By arranging the aspherical surface having such a shape in the vibration-proof group, it is made easier to correct comatic aberration and one-side blurring at the time of the vibration insulation and it is made possible to implement a zoom lens having higher optical performance. Note that the term "one-side blurring" at the time of the vibration insulation refers to an aberration that appears in a state where an real image plane is inclined with respect to an ideal image plane in the direction in which the vibration-proof group is decentered when the vibration-proof group is decentered at the time of the vibration insulation.

(7) Lens Group Construction

The number of the lens groups of which the zoom lens is composed is not limited to a particular number and, for example, various lens group constructions can be adopted such as the zoom lens of a 5-group construction which is composed of the first lens group having a positive refractive power, the second lens group having a negative refractive power, the third lens group having a positive refractive power, the fourth lens group having a negative refractive power, and the fifth lens group having a positive refractive power, where the third and subsequent lens groups are the rear group; or the zoom lens of a 4-group construction which is composed of the first lens group having a negative refractive power, the second lens group having a positive refractive power, the third lens group having a negative refractive power, and the fourth lens group having a positive refractive power, where the second and subsequent lens groups are the rear group; or the zoom lens of a 6-group construction which is composed of the first lens group having a positive refractive power, the second lens group having a negative refractive power, the third lens group having a positive refractive power, the fourth lens group having a positive refractive power, the fifth lens group having a negative refractive power, and the sixth lens group having a positive refractive power, where the third and subsequent lens groups are the rear group. The specific lens group construction of the zoom lens is not limited to a particular one as long as the construction ensures that the front group having a negative refractive power is arranged on the object side of the widest air interval at the wide-angle end and the rear group having a positive refractive power is arranged on the image side of the widest air interval at the wide-angle end.

1-2. Operation (1) Operation at the Time of Changing Focal Length

In accordance with the zoom lens, the air interval between the lens groups is changed such that at least the air interval between the front group and the rear group is reduced at the time of changing focal length from the wide-angle end to the telephoto end.

Note that it is assumed here that, when the front group and/or the rear group include multiple lens groups, the air intervals between the individual lens groups also change at the time of changing focal length. It suffices that at least the air interval between the front group and the rear group is reduced at the time of changing focal length from the wide-angle end to the telephoto end, and increase or decrease in the other air intervals between the lens groups does not constitute a limitation. Also, all the lens groups of which the zoom lens is composed may be moved in the direction along the optical axis at the time of changing focal length, or some of the lens groups may be fixed in the direction along the optical axis while the remaining lens group are moved in the direction along the optical axis. The possibility of movement of the individual lens groups and the direction of the movement do not constitute any particular limitation.

Note that when the first lens group arranged to be closest to the object side in the zoom lens is made to move toward the object side at the time of changing focal length from the wide-angle end to the telephoto end, the optical overall length of the zoom lens at the wide-angle end can be shortened. In this case, a nested structure is constructed in which the lens barrel is constructed such that the inner tube part is able to be drawn out from the outer tube part and, when for example, the inner tube par is drawn out to move the first lens group towards the object side at the time of changing focal length from the wide-angle end to the telephoto end and the inner tube part is accommodated in the outer tube part at the time of changing focal length from the telephoto end to the wide-angle end, then it is made possible to shorten the lens barrel length in the wide-angle end state and achieve miniaturization of the zoom lens unit.

(2) Operation at the Time of Focusing

In accordance with the zoom lens of this embodiment, at the time of focusing from infinity to the close object, the above-described focus group arranged in the rear group moves in the direction along the optical axis. Although the direction of movement of the focus group at the time of focusing is not particularly limited, it is preferable, for example, that it moves toward the image side at the time of focusing from infinity to the close object.

Note that, when the negative refractive power is arranged in the front group arranged on the object side, the positive refractive power is arranged in the rear group arranged on the image side, and the above-described focus group is arranged in the rear group, then the amount of generation of axial chromatic aberration and the amount of generation of spherical aberration at the time of imaging of the close object are smaller at the wide-angle end than at the telephoto end. As a result, even when the shortest imaging distance at the wide-angle end is made shorter than the shortest imaging distance at the telephoto end, the amounts of generation of the above-described aberrations at the wide-angle end are small. Accordingly, when the shortest imaging distance at the wide-angle end is shortened relative to the shortest imaging distance at the telephoto end, it is made possible to select as appropriate the viewing angle in accordance with the distance from the object and the size of the object, and extend the imaging scene that can be imaged by the zoom lens. Note that the term "shortest imaging distance" as used herein (the shortest shooting distance) refers to the shortest distance from the image forming plane to the object.

Note that, in addition to the focus group composed of the above-described cemented lens, other lens groups or some of the lens groups may be moved at the time of focusing. That is, the focusing may be performed based on the floating system. In an imaging lens that adopts the retrofocus type power arrangement, when the floating system is adopted, aberration correction at the time of focusing is facilitated, so that focusing based on the floating system is preferable in view of implementing a zoom lens having a high optical performance.

However, in the floating system, the construction of the focus driving mechanism becomes complicated because multiple lens groups are to be moved at the time of focusing. Accordingly, in view of ensuring the miniaturization and reduction in the weight of the zoom lens, in place of the floating system, it is preferable that only the above-described focus group composed of the above-described cemented lens is moved at the time of focusing. That is, it is preferable that the zoom lens does not include any lens group that moves on the optical axis at the time of focusing except for the above-described focus group.

Note that, according to the present invention, even when focusing is to be made based on the floating system, it suffices that the above-described focus group has the construction and satisfies the conditions described in the present specification. That is, the other lens groups or part of the lens groups moving in conjunction with the above-described focus group at the time of focusing are not particularly limited.

1-2. Conditional Expressions

It is preferable that the zoom lens adopt the above-described construction and satisfies at least one or more of the conditional expressions explained below.

1-2-1. Conditional Expression (1)

$$3.80 < Cr1f/fw \quad (1)$$

where:

Cr1f denotes a radius of curvature of the surface closest to the object side of the zoom lens; and fw denotes a focal length of the zoom lens at the wide-angle end.

The conditional expression (1) is an expression for defining the ratio between the radius of curvature of the surface closest to the object side of the zoom lens and the focal length of the zoom lens at the wide-angle end. A positive value of the conditional expression (1) means that the surface closest to the object side of the zoom lens has a planar or convex shape that is convex to the object side. When the conditional expression (1) is satisfied, the radius of curvature of the surface closest to the object side of the zoom lens falls within an appropriate range in relation to the focal length of the zoom lens at the wide-angle end, and it is made possible to correct the distortion aberration and the field curvature in a well-balanced manner.

On the other hand, if the value of the conditional expression (1) is equal to or smaller than the lower limit value, the radius of curvature of the surface closest to the object side of the zoom lens is too small relative to the focal length of the zoom lens at the wide-angle end, the distortion aberration is excessively corrected, and correction of the field curvature is difficult, so that this is not favorable.

In order to obtain these effects, the lower limit value of the conditional expression (1) is more preferably set to 4.00, much more preferably set to 4.20, yet more preferably set to 4.50, still more preferably set to 4.80, further more preferably set to 5.10, and most preferably set to 6.50. Also, the upper limit value of the conditional expression (1) is not limited to a specific value. Meanwhile, if the upper limit value is to be specified, then it is preferably set to 100.00, much more preferably set to 50.00 and yet more preferably set to 40.00.

1-2-2. Conditional Expression (2)

$$0.50 < (-ffw + Dfrw)/FBw < 2.00 \quad (2)$$

where:

ffw denotes the composite focal length of the front group at the wide-angle end;

Dfrw denotes the distance on the optical axis between the surface closest to the image side of the front group and the surface closest to the object side of the rear group at the wide-angle end; and FBw is an air conversion length from the surface closest to the image side of the zoom lens to the image forming plane at the wide-angle end.

The conditional expression (2) is an expression for defining the ratio of the distance of the focusing point of the luminous flux incident on the rear group and the distance of the focusing point of the luminous flux exiting the rear group at the wide-angle end. In the conditional expression (2), the numerator represents the distance on the optical axis from the focusing point of the luminous flux incident on the rear group to the surface closest to the object side of the rear group. The denominator is a so-called backfocus and represents the distance on the optical axis from the focusing point of the luminous flux exiting the rear group to the surface closest to the image side of the rear group. When the conditional expression (2) is satisfied, it is made possible to miniaturize the zoom lens while ensuring a backfocus appropriate for the interchangeable lens system. Note that the surface closest to the object side of the front group refers to the lens surface arranged to be closest to the object side in the front group and the surface closest to the image side of the rear group refers to the lens surface arranged to be closest to the image side in the rear group.

On the other hand, a value equal to or greater than the upper limit value of the conditional expression (2) leads to a shorter backfocus at the wide-angle end. As a result, it becomes difficult to ensure a backfocus appropriate for the interchangeable lens system. Also, a value of the conditional expression (2) equal to or larger than the upper limit value means that the focusing point of the luminous flux incident on the rear group is distant. That is, the focusing point of the luminous flux incident on the rear group resides on the object side and the optical overall length at the wide-angle end is elongated, so that it becomes difficult to achieve miniaturization of the zoom lens. In view of these facts, it is preferable that the value of the conditional expression (2) is less than the upper limit value.

Meanwhile, a value equal to or less than the lower limit value of the conditional expression (2) leads to a longer backfocus at the wide-angle end, which makes it easier to ensure a backfocus appropriate for the interchangeable lens system. However, when the backfocus becomes too long, optical overall length at the wide-angle end is elongated. Consequently, in this case as well, it becomes difficult to realize miniaturization of the zoom lens. In view of these facts, it is preferable that the value of the conditional expression (2) is greater than the lower limit value.

In order to obtain these effects, the lower limit value of the conditional expression (2) is preferably set to 0.60, more preferably set to 0.70, much more preferably set to 0.80, yet more preferably set to 0.90, still more preferably set to 1.05, and further more preferably set to 1.15. Also, the upper limit value of the conditional expression (2) is preferably set to 1.95 and more preferably set to 1.92.

1-2-3. Conditional Expression (3)

In accordance with the zoom lens, it is preferable, as described above, that the vibration-proof group has at least one lens Lvcn having a negative refractive power and at least one lens Lvcp having a positive refractive power. Note that the following condition should be more preferably satisfied.

$$22.00 < 1/|(1/vdLvcn)-(1/vdLvcp)| < 70.00 \quad (3)$$

where:
vdLvcn denotes Abbe number on the d-line of the lens Lvcn; and
vdLvcp denotes Abbe number on the d-line of the lens Lvcp.

The conditional expression (3) is an expression for defining the difference in the Abbe number between the above-described lens Lvcn and the above-described lens Lvcp when the vibration-proof group has the above-described lens Lvcn and the above-described lens Lvcp. When the conditional expression (3) is satisfied, then a better equilibrium can be found between the correction of the chromatic aberration and the glass material cost, and it is made possible to suppress excessive increase in the cost while achieving a zoom lens having a high optical performance with a reduced amount of generation of the chromatic aberration at the time of the vibration insulation.

On the other hand, a value equal to or greater than the upper limit value of the conditional expression (3) leads to insufficient correction of the chromatic aberration, which makes it difficult to perform correction of the magnification chromatic aberration at the time of the vibration insulation, and such a consequence would be unfavorable. Meanwhile, a value equal to or less than the lower limit value of the conditional expression (3) leads to excessive correction of the chromatic aberration and, in this case as well, it becomes difficult to perform correction of the magnification chromatic aberration at the time of the vibration insulation, and such a consequence would be likewise unfavorable. Further, a glass material ensuring that the numerical value of the conditional expression (3) becomes equal to or less than the lower limit value is a costly material with a high refractive index. As a result, from the viewpoint of costs as well, the value of the conditional expression (3) equal to or less than the lower limit value would be an unfavorable consequence.

In order to obtain these effects, the lower limit value of the conditional expression (3) is more preferably set to 22.50, much more preferably set to 23.00, yet more preferably set to 23.50, still more preferably set to 24.00, and further more preferably set to 24.20. Also, the upper limit value of the conditional expression (3) is more preferably set to 60.00, much more preferably set to 55.00, yet more preferably set to 50.00 and still more preferably set to 47.00.

Note that the above-described effect can be obtained when at least one each of the above-described lens Lvcn and the above-described lens Lvcp are included in the vibration-proof group. Note that the vibration-proof group may include a lens that does not satisfy the conditional expression (3), but it is preferable in view of the chromatic aberration and the cost that all the lenses included in the vibration-proof group satisfy the conditional expression (3). It would be further preferable that the vibration-proof group is composed of two lenses consisting of one lens Lvcn and one lens Lvcp in view of the chromatic aberration and the cost.

1-2-4. Conditional Expression (4)

$$0.50 < |(1-\beta vct) \times \beta vctr| < 6.00 \quad (4)$$

where:
$\beta vct$ denotes the lateral magnification of the vibration-proof group at the time of focusing on infinity at the telephoto end; and
$\beta vctr$ denotes the composite lateral magnification at the time of focusing on infinity of all of one or more lenses arranged to be closer to the image side than the vibration-proof group at the telephoto end.

The conditional expression (4) is an expression for defining the blurring correction coefficient of the vibration-proof group. Note that the blurring correction coefficient indicates the movement distance of the image forming plane when the vibration-proof group moves by a unit amount. When the conditional expression (4) is satisfied, then it is made possible to bring the movement distance of the vibration-proof group at the time of vibration insulation into an appropriate range and achieve highly-accurate and prompt image blur correction, and it is made easier to realize miniaturization of the zoom lens.

On the other hand, a value equal to or less than the lower limit value of the conditional expression (4) leads to an excessively small blurring correction coefficient of the vibration-proof group. As a result, the movement distance of the vibration-proof group at the time of the vibration insulation becomes large, and it is necessary to increases the outer diameter of the lens barrel and ensure a space in which the vibration-proof group is movable. Also, increase in the movement distance of the vibration-proof group leads to a larger size of the vibration insulation driving mechanism. These unfavorable consequences make it difficult to miniaturize the zoom lens. Also, a value equal to or greater than the upper limit value of the conditional expression (4) leads to a too large blurring correction coefficient of the vibration-proof group. As a result, the movement distance of the vibration-proof group at the time of the image blur correction becomes too small, which necessitates highly accurate position control, and such a consequence would be unfavorable.

In order to obtain these effects, the lower limit value of the conditional expression (4) is more preferably set to 0.60, much more preferably set to 0.70, yet more preferably set to 0.85, still more preferably set to 1.00, and further more preferably set to 1.10. Also, the upper limit value of the conditional expression (4) is more preferably set to 5.00, much more preferably set to 4.10, yet more preferably set to 3.00, still more preferably set to 2.30, and further more preferably set to 2.20.

1-2-5. Conditional Expression (5)

$$0.00 < (Crff + Crfr)/(Crff - Crfr) < 5.00 \quad (5)$$

where:
Crff denotes the radius of curvature of the surface closest to the object side of the focus group; and
Crfr denotes the radius of curvature of the surface closest to the image side of the focus group.

The above-described conditional expression (5) is an expression for defining the shapes of the surface closest to the object side and the surface closest to the image side of the focus group. The surface closest to the object side of the focus group refers to the object-side surface of the lens arranged to be closest to the object side among the lenses of which focus group is composed. Likewise, the surface closest to the image side of the focus group refers to the image-side surface of the lens arranged to be closest to the image side among the lenses of which focus group is composed. When the shapes of the surface closest to the object side and the surface closest to the image side of the focus group conform to the shapes defined in accordance with the above-described conditional expression (5), it is made possible to perform excellent correction of the spherical aberration, aberration fluctuation at the time of focusing on a close object can be reduced, and the zoom lens having a high optical performance over the entire focusing area can be achieved.

In order to obtain these effects, the lower limit value of the conditional expression (5) is more preferably set to 0.05, much more preferably set to 0.08, yet more preferably set to 0.10 and still more preferably set to 0.15. Also, the upper limit value of the conditional expression (5) is more preferably set to 4.50, much more preferably set to 4.00 and yet more preferably set to 3.00.

1-2-6. Conditional Expression (6)

$$1.20 < |\{1 - (\beta ft \times \beta ft)\} \times \beta ftr \times \beta ftr| < 15.00 \quad (6)$$

where:
$\beta ft$ denotes the lateral magnification at the time of focusing on infinity of the focus group at the telephoto end; and
$\beta ftr$ denotes the composite lateral magnification at the time of focusing on infinity of all of one or more lenses arranged to be closer to the image side than the focus group at the telephoto end.

The conditional expression (6) is an expression for defining the focus sensitivity of the focus group. Note that the focus sensitivity indicates the movement distance of the image forming plane when the focus group moves by a unit amount. When the conditional expression (6) is satisfied, then it is made possible to bring the movement distance of the focus group at the time of focusing from the infinity object to the close object into an appropriate range, it is made easier to achieve prompt autofocusing and realize miniaturization of the zoom lens.

On the other hand, a value equal to or less than the lower limit value of the conditional expression (6) leads to excessively small focus sensitivity of the focus group. As a result, the movement distance of the focus group at the time of focusing from an infinity object to a close object becomes large, and the optical overall length becomes long, which, unfavorably, makes it difficult to miniaturize the zoom lens. Also, when a value equal to or greater than the upper limit value of the conditional expression (6) leads to too large focus sensitivity of the focus group. As a result, the movement distance of the focus group for correcting the positional deviation of the in-focus position becomes too small, which necessitates highly accurate position control, and such a consequence would be unfavorable.

In order to obtain these effects, the lower limit value of the conditional expression (6) is more preferably set to 1.50, much more preferably set to 2.00, yet more preferably set to 2.50, still more preferably set to 3.00, and further more preferably set to 3.60. Also, the upper limit value of the conditional expression (6) is more preferably set to 14.00, much more preferably set to 13.00, and yet more preferably set to 12.00.

$$|\beta ft| > 1 \quad (6\text{-}1)$$

Note that the absolute value of "$\beta ft$" in the conditional expression (6) is preferably greater than 1. As mentioned above, "$\beta ft$" refers to the lateral magnification of the focus group at the time of focusing on infinity at the telephoto end. The focus group is included in the rear group. When the lens group (focus group) included in the rear group has a lateral magnification greater than 1, it is made possible to miniaturize the zoom lens in the direction along the optical overall length and in its radial direction.

1-2-7. Conditional Expression (7) In accordance with the zoom lens, it is preferable, as described above, that at least one lens surface Sr having a negative refractive power be provided closer to the image side than the focus group. Note that the following conditional expression should be more preferably satisfied.

$$-0.400 < |fw \times \tan \omega w|/(fsr - FBw) < -0.002 \quad (7)$$

where:
$\omega w$ denotes a half image viewing angle of the most off-axis principal ray of the zoom lens at the wide-angle end; and
fsr denotes the focal length of the lens surface Sr.

The conditional expression (7) is an expression that represents in a simulated manner the ratio between the focusing point of the lens surface Sr and the image height of the most off-axis principal ray on the image forming plane. Note that principal ray refers to a light beam passing the center of the stop. When the lens surface Sr that satisfies the conditional expression (7) is arranged on the image side of the focus group, it is made possible to correct in an excellent manner a field curvature using the lens surface Sr. This facilitates implementation of a zoom lens having a higher performance.

On the other hand, a value equal to or greater than the upper limit value of the conditional expression (7) leads to a too low negative refractive power of the lens surface Sr. In this case, the field curvature is too negative, making it difficult to improve the performance of the zoom lens, and this is not favorable. Meanwhile, a value equal to or less than the lower limit value of the conditional expression (7) leads to too great a negative refractive power of the lens surface Sr. In this case, insufficient correction of the Petzval sum results, making it difficult to improve the performance of the zoom lens, and such a consequence would be unfavorable. Also, two or more lens surfaces Sr may be provided, in which case it suffices that either or any one of these lens surfaces satisfy the conditional expression (7) and, more preferably, all of these lens surface Sr should satisfy the conditional expression (7), which facilitates improvement of the performance.

In order to obtain these effects, the upper limit value of the conditional expression (7) is more preferably set to −0.004, much more preferably set to −0.006, yet more preferably set to −0.008, still more preferably set to −0.010, and further more preferably set to −0.012. Also, the lower limit value of the conditional expression (7) is more preferably set to −0.350, much more preferably set to −0.300, yet more preferably set to −0.250, still more preferably set to −0.230, and further more preferably set to −0.220.

1-2-8. Conditional Expression (8)

In accordance with the zoom lens, it is preferable, as described above, that the rear group has at least one lens Lrn having a negative refractive power and arranged to be closer to the object side than the focus group. Note that it is preferable that the following condition is satisfied.

$$1.84 < NdLrn < 2.10 \quad (8)$$

where:
NdLrn denotes the refractive index on the d-line of the lens Lrn.

The conditional expression (8) is an expression for defining the refractive index on the d-line of the lens Lrn. Note that the rear group has a positive refractive power. As a result, in order to excellently correct the Petzval sum, it is necessary to arrange in the rear group a lens having a negative refractive power and made of a glass material having a high refractive index. A glass material that satisfies the conditional expression (8) is well-balanced considering the correction of the Petzval sum and the glass material cost. As a result, when the rear group has the lens Lrn that satisfies the conditional expression (8) on the object side of the focus group, it is made possible to suppress excessive increase in cost while implementing a zoom lens having a high optical performance.

On the other hand, a value equal to or less than the lower limit value of the conditional expression (8) leads to a small refractive index on the d-line of the lens Lrn, where correction of the Petzval sum cannot be performed sufficiently, and this is not favorable. Meanwhile, a value equal to or greater than the upper limit value of the conditional expression (8) leads to a larger refractive index on the d-line of the lens Lrn, which is preferable in terms of the correction of the Petzval sum. However, a glass material having a large refractive index on the d-line is generally expensive when compared with a glass material having a small refractive index on the d-line. When a glass material is used whose refractive index on the d-line is greater than the upper limit value, effects related to the correction of the Petzval sum can be obtained but they are small considering the cost effectiveness. As a result, the value of the conditional expression (8) becoming equal to or greater than the upper limit value would be unfavorable in view of the costs.

In order to obtain these effects, the lower limit value of the conditional expression (8) is more preferably set to 1.860, much more preferably set to 1.870, and yet more preferably set to 1.880. Also, the upper limit value of the conditional expression (8) is more preferably set to 2.070, much more preferably set to 2.010, and yet more preferably set to 1.960.

1-2-9. Conditional Expression (9)

In accordance with the zoom lens, it is preferable, as described above, that the rear group has at least one lens Lrn having a negative refractive power and arranged to be closer to the object side than the focus group. Note that it is preferable that the following condition is satisfied.

$$-0.015 < \Delta PgF < 0.022 \quad (9)$$

where:
$\Delta PgF$ denotes the deviation of the partial dispersion ratio from the reference line in the coordinate system with the partial dispersion ratio on the vertical axis and Abbe number vd on the d-line on the horizontal axis, where the line passing through the coordinates of the glass material C7 where the partial dispersion ratio is 0.5393 and vd is 60.49 and the coordinates of the glass material F2 where the partial dispersion ratio is 0.5829 and vd is 36.30 is defined as the reference line.

Note that, if the refractive index of glass in relation to the g-line (435.8 nm), the F-line (486.1 nm), the d-line (587.6 nm), and the C-line (656.3 nm) are given as Ng, NF, Nd, and NC, respectively, then the Abbe number (vd) and the partial dispersion ratio (PgF) can be expressed as shown below:

$$vd = (Nd-1)/(NF-NC)$$

$$PgF = (Ng-NF)/(NF-NC)$$

The conditional expression (9) is an expression for defining the anomalous dispersibility of the lens Lrn. Note that the rear group has a positive refractive power. A negative lens made of high dispersion glass material and a positive lens made of a low dispersion glass material are often used in combination with each other in order to perform correction of chromatic aberration in the lens group having a positive refractive power. However, the dispersion property of the high dispersion glass material in relation to the wavelength is quadratic curve while the dispersion property of the low dispersion glass material in relation to the wavelength is linear. As a result, when a negative lens made of high dispersion glass material is combined with a positive lens made of a low dispersion glass material, while it is possible to reduce the chromatic aberration to zero at a certain wavelength, chromatic aberration remains to exist at other wavelengths, making it impossible to correct the chromatic aberration over the entire wavelength range in use.

In view of this, it is made possible to correct the chromatic aberration over the entire wavelength range in use by combining a lens Lrn made of a glass material with a low anomalous dispersibility, having a negative refractive power, and satisfying the above-described conditional expression (9) with, for example, a positive lens made of a glass material with a high anomalous dispersibility which will be described below. It is made possible to implement the zoom lens having a high optical performance and excelling in chromatic aberration over the entire wavelength range in use by arranging a lens Lrn having a negative refractive power and satisfying conditional expression (9) on the object side of the focus group. Note that the lens Lrn should more preferably satisfy the conditional expression (9) as well as the above-described conditional expression (8) for excellent chromatic aberration correction.

In order to obtain these effects, the lower limit value of the conditional expression (9) is more preferably set to −0.012, and much more preferably set to −0.010. Also, the upper limit value of the conditional expression (9) is more preferably set to 0.014, much more preferably set to 0.013, and yet more preferably set to 0.012.

Note that the rear group in the zoom lens preferably has a lens Lrn that satisfies the above-described conditional expression (9) on the object side of the focus group, and has a lens Lrp that has a positive refractive power and satisfies the following conditional expression (9-1).

$$0.009 < \Delta PgFp < 0.060 \tag{9-1}$$

where:
$\Delta PgFp$ denotes the deviation of the partial dispersion ratio from the reference line in the coordinate system with the partial dispersion ratio on the vertical axis and Abbe number vd on the d-line on the horizontal axis, where the line passing through the coordinates of the glass material C7 where the partial dispersion ratio is 0.5393 and vd is 60.49 and the coordinates of the glass material F2 where the partial dispersion ratio is 0.5829 and vd is 36.30 is defined as the reference line.

A glass material that satisfies the conditional expression (9-1) has a high anomalous dispersibility, and the dispersion property in relation to the wavelength is quadratic curve. As a result, when a lens Lrp having a positive refractive power and satisfying the conditional expression (9-1) is arranged in the rear group along with a lens Lrn that satisfies the above-described conditional expression (9), it is made possible to implement the zoom lens that excels in chromatic aberration over the entire wavelength range in use.

1-2-10. Conditional Expression (10)

It is preferable in accordance with the zoom lens that the front group has at least one lens group having a negative refractive power and, when the lens group having the largest negative refractive power in the front group is defined as a negative lens group n, the following condition should be satisfied.

$$-2.00 < fn/fw < -0.55 \tag{10}$$

where:
fn denotes the focal length of the negative lens group n; and
fw denotes a focal length of the zoom lens at the wide-angle end.

The conditional expression (10) is an expression for defining the ratio between the focal length of the negative lens group n included in the front group and the focal length of the zoom lens at the wide-angle end. When the conditional expression (10) is satisfied, it is made possible to widen the image viewing angle at the wide-angle end while suppressing increase in the size of the zoom lens. Also, it is made possible to correct field curvature, comatic aberration, distortion aberration, and the like using a smaller number of lenses and implement a small-sized zoom lens having a high optical performance.

On the other hand, a value equal to or less than the lower limit value of the conditional expression (10) leads to a small refractive power of the negative lens group n having the largest refractive power included in the front group relative to the focal length of the zoom lens at the wide-angle end, so that the effect of widening the image viewing angle by the negative lens group n arranged in the front group is reduced. In that case, in order to achieve widening the image viewing angle at the wide-angle end, it is necessary to increase the outer diameter of the so-called lens which is closest to the object side in the zoom lens, which makes it difficult to achieve miniaturization of the zoom lens. Meanwhile, a value equal to or greater than the upper limit value of the conditional expression (10) leads to a large refractive power of the negative lens group n having the largest refractive power included in the front group relative to the focal length of the zoom lens at the wide-angle end. As a result, it becomes difficult to correct various aberrations such as field curvature, comatic aberration, and distortion aberration. As a result of this, in order to implement a zoom lens having a high optical performance, it is necessary to increase the number of lenses for aberration correction, which makes it difficult to achieve miniaturization of the zoom lens.

In order to obtain these effects, the lower limit value of the conditional expression (10) is more preferably set to −1.90, much more preferably set to −1.80, and yet more preferably set to −1.60. Also, the upper limit value of the conditional expression (10) is more preferably set to −0.58, much more preferably set to −0.62, and yet more preferably set to −0.68.

1-2-11. Conditional Expression (11)

$$-0.70 < ff/ft < -0.05 \tag{11}$$

where:
ff denotes the focal length of the focus group; and
ft denotes a focal length of the zoom lens at the telephoto end.

The above-described conditional expression (11) is an expression for defining the ratio between the focal length of the focus group and the focal length of the zoom lens at the telephoto end. When the conditional expression (11) is satisfied, then it is made possible to suppress occurrence of an axial chromatic aberration, a spherical aberration, a field curvature, and the like at the time of focusing on a close object and achieve the zoom lens having a high optical performance over the entire focusing area. Also, conditional expression (11) is satisfied, then the refractive power of the focus group falls within an appropriate range, so that it is made possible to bring the focus sensitivity into an appropriate range. When the focus sensitivity falls within an appropriate range, it is made possible to bring the movement distance of the focus group at the time of focusing from an infinity object to a close object into an appropriate range, achieve prompt autofocusing, and facilitate implementation of miniaturization of the zoom lens.

On the other hand, a value equal to or less than the lower limit value of the conditional expression (11) leads to a large focal length of the focus group relative to the focal length of the zoom lens at the telephoto end. That is, the refractive power of the focus group becomes too small. In this case, the focus sensitivity of the focus group becomes too low, so that the amount of the movement of focus group at the time of focusing on a close object becomes large. As a result, it is necessary to ensure an air interval for moving the focus group, which causes increase in the optical overall length of the zoom lens, and such a consequence would be unfavorable. Meanwhile, a value equal to or greater than the upper limit value of the conditional expression (11) leads to a small focal length of the focus group relative to the focal length of the zoom lens at the telephoto end. That is, the refractive power of the focus group becomes too large. In this case, since axial chromatic aberration, spherical aberration, and field curvature at the time of focusing on a close object become large, it becomes difficult to maintain a high optical performance over the focusing area, and such a consequence would be unfavorable. Also, in this case, the focus sensitivity of the focus group becomes too high. An excessively high focus sensitivity necessitates highly accurate position control for correcting the positional deviation of the in-focus position, and this is not favorable.

In order to obtain these effects, the lower limit value of the conditional expression (11) is more preferably set to −0.65, much more preferably set to −0.60, yet more preferably set to −0.55 and still more preferably set to −0.45. Also, the upper limit value of the conditional expression (11) is more preferably set to −0.08, much more preferably set to −0.10, and yet more preferably set to −0.12.

1-2-12. Conditional Expression (12)

It is preferable in accordance with the zoom lens that the focus group has a lens Ln having at least one negative refractive power and satisfy the following condition.

$$45.0 < vdLn < 98.0 \quad (12)$$

where vdLn denotes Abbe number on the d-line of the lens Ln.

The above-described conditional expression (12) is an expression for defining the Abbe number of the lens Ln having a negative refractive power and included in the focus group. When the conditional expression (12) is satisfied, then the correction of the chromatic aberration becomes excellent, and, implementation of a zoom lens having a high optical performance can be facilitated. Also, glass materials that satisfy the conditional expression (12) often have a low specific gravity and are effective for ensuring a more light-weight focus group.

On the other hand, a value equal to or less than the lower limit value of the conditional expression (12) leads to a larger chromatic dispersion of the above-described lens Ln, which makes it difficult to correct the axial chromatic aberration at the time of focusing on a finite distance object, and such a consequence would be unfavorable. Meanwhile, when the value of the conditional expression (12) is equal to or greater than the upper limit value, the chromatic dispersion of the above-described lens Ln of which the focus group is composed becomes small, and this is preferable in terms of correction of the chromatic aberration. However, a glass material having a larger Abbe number is expensive when compared with a glass material having a small Abbe number. When a glass material is used whose Abbe number is equal to or greater than the upper limit value, effects related to the correction of the chromatic aberration can be obtained but they are small considering the cost effectiveness. As a result, the value of the conditional expression (12) becoming equal to or greater than the upper limit value would be unfavorable in view of the costs.

In order to obtain these effects, the lower limit value of the conditional expression (12) is more preferably set to 45.5, much more preferably set to 46.0, yet more preferably set to 47.0, still more preferably set to 49.0, and further more preferably set to 51.0. Also, the upper limit value of the conditional expression (12) is more preferably set to 82.0, much more preferably set to 76.0, yet more preferably set to 68.0, still more preferably set to 65.0, and further more preferably set to 62.0.

1-2-13. Conditional Expression (13)

It is preferable in accordance with the zoom lens that, the first lens group moves toward the object at the time of changing focal length from the wide-angle end to the telephoto end as described above. In this case, it is preferable that the following conditional expression (13) be satisfied.

$$0.01 < |X1|/ft < 0.65 \quad (13)$$

where:

X1 denotes a movement distance when the first lens group moves from the position closest to the image side, where the first lens group can be positioned, to the position closest to the object side, where the first lens group can be positioned, at the time of changing focal length from the wide-angle end to the telephoto end; and ft denotes a focal length of the zoom lens at the telephoto end.

The above-described conditional expression (13) is an expression for defining a movement distance of the first lens group toward the object at the time of changing focal length from the wide-angle end to the telephoto end. When the conditional expression (13) is satisfied, then the refractive power of the first lens group is appropriate and the movement distance at the time of changing focal length falls within an appropriate range. As a result, it is made possible to shorten the optical overall length of the zoom lens at the wide-angle end while ensuring the predetermined zoom ratio, and it is made possible to miniaturize the zoom lens.

On the other hand, a value equal to or less than the lower limit value of the conditional expression (13) leads to a smaller movement distance of the first lens group at the time of changing focal length described above. In this case, in order to ensure a predetermined zoom ratio, it is necessary to strengthen the refractive power of each lens group. When the refractive power of each lens group is strengthened, a large number of lenses need to be provided for aberration correction for correcting axial chromatic aberration, spherical aberration, and the like, which makes it difficult to achieve miniaturization of the zoom lens. Also, a value equal to or greater than the upper limit value of the conditional expression (13) leads to a larger movement distance of the first lens group at the time of changing focal length described above. In this case, if the lens barrel has a nested structure in which the inner tube part is accommodated in the outer tube part, when the lens barrel length is designed so as to conform to the optical overall length at the wide-angle end, then it becomes necessary to construct the inner tube part with a double structure to be accommodated in the outer tube part, which makes the structure of the lens barrel complicated and causes increase in the outer diameter of the lens barrel, and such a consequence would be unfavorable.

Note that the "an movement distance when the first lens group moves from the position closest to the image side, where the first lens group can be positioned, to the position closest to the object side, where the first lens group can be positioned, at the time of changing focal length from the wide-angle end to the telephoto end" is equal to the "distance on the optical axis (difference) at the time of changing focal length between the position closest to the image side where the first lens group can be positioned from the wide-angle end to the telephoto end and the position closest to the object side where the first lens group can be positioned." Hence, "X1" can be alternatively expressed as "the distance on the optical axis at the time of changing focal length between the position closest to the image where the first lens group can be positioned from the wide-angle end to the telephoto end and the position closest to the image side where the first lens group can be positioned." For example, when the first lens group moves toward the object while drawing the locus that is convex to the image side at the time of changing focal length from the wide-angle end to the telephoto end, then the distance between the position of the vertex of the convex locus drawn by the first lens group at the time of changing focal length (i.e., the position closest to the image side) and the position where the first lens group reside closest to the object at the wide-angle end or the telephoto end (i.e., the position closest to the object side) is X1. Note that the locus of movement of the first lens group may be convex to the image side as described above, convex to the object side, may be in the form of an S, and thus is not limited to a particular one. The locus of movement of the first lens group of course may be linear.

In order to obtain these effects, the lower limit value of the conditional expression (13) is more preferably set to 0.05, much more preferably set to 0.10, yet more preferably set to 0.15, and further more preferably set to 0.20. Also, the upper limit value of the conditional expression (13) is more preferably set to 0.60, much more preferably set to 0.55, yet more preferably set to 0.48, and further more preferably set to 0.46.

1-2-14. Conditional Expression (14)

$$0.01 < Crrf/ft \qquad (14)$$

where:
Crrf denotes the radius of curvature of the surface closest to the object side of the rear group; and
ft denotes a focal length of the zoom lens at the telephoto end.

The above-described conditional expression (14) is an expression for defining the ratio between the radius of curvature of the surface closest to the object side of the rear group and the focal length of the zoom lens at the telephoto end. A positive value of the conditional expression (14) means that the surface closest to the object side of the rear group is a planar shape or a convex shape that is convex to the object side. When the conditional expression (14) is satisfied, then the radius of curvature of the surface closest to the object side of the rear group falls within an appropriate range with respect to the focal length of the zoom lens at the telephoto end, and the correction balance between the spherical aberration and the comatic aberration becomes excellent.

In order to obtain these effects, the lower limit value of the conditional expression (14) is more preferably set to 0.03, much more preferably set to 0.06, yet more preferably set to 0.09 and still more preferably set to 0.10. Also, the upper limit value of the conditional expression (14) is not limited to a specific value. Meanwhile, if the upper limit value is to be specified, then it is preferably set to 500.00, is more preferably set to 50.00, much more preferably set to 25.00, and yet more preferably set to 12.00.

1-2-15. Conditional Expression (15)

$$0.10 < fft/ft < 1.00 \qquad (15)$$

where:
ffft denotes a composite focal length of all of one or more lenses arranged to be closer to the object side than the focus group at the telephoto end; and
ft denotes a focal length of the zoom lens at the telephoto end.

The conditional expression (15) is an expression for defining the ratio between the composite focal length of all of one or more lenses arranged to be closer to the object side than the focus group and the focal length of the zoom lens at the telephoto end. When the conditional expression (15) is satisfied, then the composite lateral magnification of all of one or more lenses groups arranged to be closer to the image side than the focus group falls within an appropriate range, it is made possible to ensure the predetermined zoom ratio and facilitate implementation of a small-sized zoom lens having a high optical performance.

On the other hand, a value equal to or less than the lower limit value of the conditional expression (15) leads to a shorter composite focal length of all of one or more lenses arranged to be closer to the object side than the focus group relative to the focal length of the zoom lens at the telephoto end. In this case, the composite lateral magnification of all of one or more lenses groups arranged to be closer to the image side than the focus group becomes large. As a result, spherical aberration and field curvature become large, making it difficult to implement a small-sized zoom lens having a high optical performance, and this is not favorable. Meanwhile, a value equal to or greater than the upper limit value of the conditional expression (15) leads to a longer composite focal length of all of one or more lenses arranged to be closer to the object side than the focus group relative to the focal length of the zoom lens at the telephoto end. In this case, the composite lateral magnification of all of one or more lenses groups arranged to be closer to the image side than the focus group becomes small. As a result, in order to ensure a predetermined zoom ratio, it is necessary to extend the distance of movement of each lens group at the time of changing focal length, making it difficult to implement miniaturization of the zoom lens in the direction along the optical axis, and this is not favorable.

In order to obtain these effects, the lower limit value of the conditional expression (15) is more preferably set to 0.15, much more preferably set to 0.20, yet more preferably set to 0.25, still more preferably set to 0.30, further more preferably set to 0.36, and most preferably set to 0.40. Also, the upper limit value of the conditional expression (15) is more preferably set to 0.90, much more preferably set to 0.80, yet more preferably set to 0.70 and still more preferably set to 0.60.

1-2-16. Conditional Expression (16)

It is preferable that the zoom lens satisfy the following condition, where in the direction in which the focus group moves at the time of focusing from infinity to the close object, the lens surface arranged to be closest to the focus group is given as lens surface Lnf.

$$0.015 < Drfrt/ft < 1.000 \qquad (16)$$

where:
Drfrt denotes the distance on the optical axis at the time of focusing on infinity between the focus group at the telephoto end and the above-described lens surface Lnf; and
ft denotes a focal length of the zoom lens at the telephoto end.

The conditional expression (16) is an expression for defining the distance (distance on the optical axis) between the focus group and the lens surface Lnf arranged to be closest to the focus group in the direction in which the focus group moves at the time of focusing from infinity to the close object. When the conditional expression (16) is satisfied, it is made possible to ensure the distance for the focus group to move in the predetermined direction at the time of focusing, and shorten the shortest imaging distance. Also, to satisfy the conditional expression (16) is effective in shortening the shortest imaging distance at the wide-angle end.

On the other hand, a value equal to or less than the lower limit value of the conditional expression (16) cannot ensure the distance in which the focus group moves in the predetermined direction at the time of focusing, the shortest imaging distance cannot be shortened, and this is not favorable. Meanwhile, a value equal to or greater than the upper limit value of the conditional expression (16) leads to a longer optical overall length at the telephoto end, which would be unfavorable in view of miniaturization of the zoom lens.

Note that the direction in which the focus group moves at the time of focusing from infinity to a close object may be oriented toward the object side or the image side. When the direction in which the focus group moves at the time of focusing from infinity to a close object is oriented toward the object, then the above-described lens surface Lnf is a lens surface arranged to be closest to the object side in the focus group. Also, when the direction in which the focus group moves at the time of focusing from infinity to a close object is oriented toward the image side, the above-described lens surface Lnf is a lens surface arranged to be closest to the image side in the focus group.

In order to obtain these effects, the lower limit value of the conditional expression (16) is more preferably set to 0.020, much more preferably set to 0.030, and yet more preferably set to 0.040. Also, the upper limit value of the conditional expression (16) is more preferably set to 0.800, much more preferably set to 0.600, yet more preferably set to 0.400, still more preferably set to 0.300, and further more preferably set to 0.250.

1-2-17. Conditional Expression (17)

$$-1.50 < fw/ffw < -0.50 \tag{17}$$

where:
fw denotes a focal length of the zoom lens at the wide-angle end;
ffw denotes the composite focal length of the front group at the wide-angle end.

The conditional expression (17) is an expression for defining the ratio between the focal length of the zoom lens at the wide-angle end and the composite focal length of the front group at the wide-angle end. When the conditional expression (17) is satisfied, it is made easier to implement a zoom lens having a high optical performance using a small number of lenses.

On the other hand, a value equal to or less than the lower limit value of the conditional expression (17) leads to the composite focal length of the front group at the wide-angle end which is shorter than the focal length of the zoom lens at the wide-angle end, which makes it difficult to perform aberration correction for correcting field curvature, comatic aberration, distortion aberration, and the like. As a result, in order to implement a zoom lens having a high optical performance, it is necessary to increase the number of the lenses for the aberration correction. That is, it is not possible to implement a zoom lens having a high optical performance using a small number of lenses, which makes it difficult to miniaturize the zoom lens, and such a consequence would be unfavorable. Meanwhile, a value equal to or greater than the upper limit value of the conditional expression (17) leads to the composite focal length of the front group at the wide-angle end which is larger than the distance of the zoom lens at the wide-angle end, so that the effect of widening the image viewing angle by the front group becomes smaller. As a result, in order to widen the image viewing angle at the wide-angle end, it is necessary to increase the lens diameter of the lens which is closest to the object side in the zoom lens makes it difficult to miniaturize the zoom lens, and such a consequence would be unfavorable.

In order to obtain these effects, the lower limit value of the conditional expression (17) is more preferably set to -1.40, much more preferably set to -1.30, and yet more preferably set to -1.20. Also, the upper limit value of the conditional expression (17) is more preferably set to -0.55, much more preferably set to -0.60 and yet more preferably set to -0.63.

1-2-18. Conditional Expression (18)

It is more preferable in accordance with the zoom lens that a lens Lp having a positive refractive power and satisfying the following conditional expression (18) be provided.

$$15.0 < vdLp < 35.0 \tag{18}$$

where vdenotes Abbe number on the d-line of the above-described lens Lp.

The conditional expression (18) is an expression for defining the Abbe number of the above-described lens Lp. When the conditional expression (18) is satisfied, then the correction of the chromatic aberration becomes excellent, and it is made possible to implement a zoom lens having a high optical performance.

On the other hand, a value equal to or less than the lower limit value of the conditional expression (18) leads to excessive correction of the chromatic aberration, making it difficult to correct axial chromatic aberration at the time of focusing on finite distance object, and this is not favorable. Further, a glass material whose value of the conditional expression (18) is equal to or less than the lower limit value is an expensive glass material having a high refractive index. As a result, the value of the conditional expression (18) equal to or less than the lower limit value is unfavorable from the viewpoint of costs as well. Meanwhile, a value equal to or greater than the upper limit value of the conditional expression (18) leads to insufficient correction of the chromatic aberration, and this is not favorable.

In order to obtain these effects, the lower limit value of the conditional expression (18) is preferably set to 18.0, and is more preferably set to 22.0. Also, the upper limit value of the conditional expression (18) is preferably set to 34.0, is more preferably set to 33.0, much more preferably set to 32.0, yet more preferably set to 31.0 and still more preferably set to 30.0.

Note that multiple pieces of the above-described lens Lp may be included in the zoom lens but only one lens Lp described above should be preferably included in the zoom lens in view of making the zoom lens compact and achieving higher performance of it. Also, arrangement of the above-described lens Lp is not limited to any particular one and it may be arranged in any of the lens groups of the zoom lens. When the above-described lens Lp is arranged in the rear group, correction of the chromatic aberration becomes more excellent and this is preferable. Further, the above-described lens Lp should be preferably arranged in the focus group and the focus group should be preferably composed of a single lens unit including the above-described lens Lp. When the above-described lens Lp is arranged in the focus group, it is made easier to correct an axial chromatic aberration at the time of focusing on finite distance object.

According to the above-described zoom lens, it is made possible to provide a standard zoom lens having a high optical performance while achieving a more lightweight focus group, and an imaging apparatus including the zoom lens. In particular, the zoom lens is allowed to have a half image viewing angle (ω) at the wide-angle end being larger than 24° while including a focal length of 50 millimeters in the zoom range in terms of 35-mm format.

2. Imaging Apparatus

Next, the imaging apparatus according to the present invention will be described. The imaging apparatus according to the present invention is characterized by the fact that it includes the above-described zoom lens according to the present invention, and an image sensor provided on the image plane side of the zoom lens and configured to convert the optical image formed by the zoom lens into an electrical signal.

Note that the image sensor and the like are not limited to particular ones and solid state image sensors such as CCD (Charge Coupled Device) sensor and CMOS (Complementary Metal Oxide Semiconductor) sensor and the like may also be used. The imaging apparatus according to the present invention is suitable for imaging apparatuses using these solid state image sensors such as a digital camera, a video camera, and the like. Also, the imaging apparatus may be a lens fixed type imaging apparatus whose lens is fixed to its housing and of course may be a lens interchangeable imaging apparatus such as a single-lens reflex camera and a mirrorless interchangeable-lens camera, etc. In particular, the zoom lens according to the present invention can ensure an appropriate backfocus that is suitable for an interchangeable lens system. As a result, it is suitable for imaging apparatuses such as a single-lens reflex camera that includes an optical viewfinder, a phase detection sensor, and a reflex mirror for branching of the light to these components, and the like.

The imaging apparatus according to the present invention may preferably include an image processing unit configured to electrically process the captured image data acquired by the image sensor and change the shape of the captured image, an image correction data holding unit configured to hold image correction data, an image correction program, and the like used in the data processing on the captured image data in the image processing unit, and other relevant units. When the zoom lens is miniaturized, deformation (distortion) of the shape of the captured image formed on the image forming plane is likely to occur. At this point, it is preferable that the distortion correction data for correcting the distortion of the shape of the captured image is held in advance in the image correction data holding unit and the image processing unit corrects the distortion of the shape of the captured image using the distortion correction data held in the image correction data holding unit. According to this imaging apparatus, it is made possible to achieve further miniaturization of the zoom lens, obtain a beautiful captured image, and achieve the miniaturization of the imaging apparatus.

Further, in the imaging apparatus according to the present invention, it is preferable that magnification chromatic aberration correction data is held in advance in the above-described image correction data holding unit and the image processing unit performs the magnification chromatic aberration on the captured image using the magnification chromatic aberration correction data held in the image correction data holding unit. When magnification chromatic aberration, that is, color distortion aberration is corrected by the image processing unit, it is made possible to reduce the number of lenses of which the optical system is composed. As a result, according to this imaging apparatus, it is made possible to seek further miniaturization of the zoom lens, obtain a beautiful captured image, and achieve the miniaturization of the imaging apparatus.

Next, the resent invention will be specifically described by way of the illustration of the examples. Note that the present invention is not limited to the examples described below. The zoom lens of each example described hereinbelow is applicable to imaging apparatuses (optical devices) such as a digital camera, video camera, silver salt film camera, and the like. Also, in each lens cross-sectional view, the left side on the figure corresponds to the object side and the right side to the image forming plane side.

Example 1

(1) Optical Construction of the Zoom Lens

FIG. 1 is a lens cross-sectional view that illustrates the lens construction of the zoom lens of Example 1 according to the present invention at the time of focusing on infinity at the wide-angle end. The zoom lens is composed of, in order from the object side, the first lens group G1 having a positive refractive power, the second lens group G2 having a negative refractive power, the third lens group G3 having a positive refractive power, the fourth lens group G4 having a negative refractive power, and the fifth lens group G5 having a positive refractive power. The fourth lens group G4 moves toward the image along the optical axis at the time of focusing from an infinity object to a close object. The aperture stop S is arranged on the object side of the third lens group G3. According to this example, the front group is composed of the first lens group G1 and the second lens group G2, and the rear group composed of the third lens group G3, the fourth lens group G4, and the fifth lens group G5. The distance between the second lens group G2 and the third lens group G3 is the "widest air interval at the wide-angle end."

The construction of the respective lens groups will be described below. The first lens group G1 is composed of, in order from the object side, a cemented lens obtained by cementing an object-side convex negative meniscus lens L1 and a convex lens L2; and an object-side convex positive meniscus lens L3.

The second lens group G2 is composed of, in order from the object side, object-side convex negative meniscus lens L4, a biconcave lens L5, a biconvex lens L6, and an object-side concave negative meniscus lens L7. The object-side surface of the negative meniscus lens L4 is aspherical. Also, the two surfaces of negative meniscus lens L7 are aspherical.

The third lens group G3 is composed of, in order from the object side, an aperture stop S, a biconvex lens L8, a cemented lens obtained by cementing a biconcave lens L9 and a biconvex lens L10, a cemented lens obtained by cementing a biconcave lens L11 and an object-side convex positive meniscus lens L12, a biconvex lens L13, a cemented lens obtained by cementing a biconcave lens L14 and a biconvex lens L15, and a biconvex lens L16. The image-side surface of the biconvex lens L8 is aspherical, and the object-side surface of the biconcave lens L11 is aspherical. The biconcave lens L14 corresponds to the above-described lens Lrn, and the biconvex lens L15 corresponds to the above-described Lrp. ΔPgF of the biconcave lens L14 is 0.000 and ΔPgFp of the biconvex lens L10 is 0.0375.

The fourth lens group G4 is composed of, in order from the object side, a cemented lens obtained by cementing an image-side convex positive meniscus lens L17 and a biconcave lens L18. The fourth lens group G4 is only composed of a cemented lens having a negative refractive power, the positive meniscus lens L17 corresponds to the above-described lens Lp, and the biconcave lens L18 corresponds to the above-described lens Ln.

The fifth lens group G5 is composed of, in order from the object side, a biconvex lens L19, and an object-side concave negative meniscus lens L20. The object-side surface of the negative meniscus lens L20 corresponds to the above-described lens surface Sr.

According to the zoom lens of Example 1, at the time of changing focal length from the wide-angle end to the telephoto end, the first lens group G1 moves toward the object with respect to the image plane, the second lens group G2 moves toward the image, the third lens group G3 moves toward the object, the fourth lens group G4 moves toward the object, and the fifth lens group G5 is fixed in the direction along the optical axis.

When an image blur occurs due to a hand-shake etc. at the time of imaging, the cemented lens obtained by cementing the biconcave lens L11 and the object-side convex positive meniscus lens L12 included in the third lens group G3 is defined as the vibration-proof group, the vibration-proof group is moved in a direction generally perpendicular to the optical axis to shift the image, and thus the image blur correction is performed. Note that the biconcave lens L11 corresponds to the above-described lens Lvcn, and the positive meniscus lens L12 corresponds to the above-described lens Lvcp. Also, the object-side surface of the biconcave lens L11 has an aspherical shape that causes the refractive power to be smaller than the refractive power determined from the paraxial radius of curvature.

Also, "IMG" illustrated in FIG. 1 indicates the image forming plane, which specifically indicates an imaging plane of a solid state image sensor such as a CCD sensor, a CMOS sensor, and the like or a film surface of a silver halide film. Also, a parallel flat plate having no substantial refractive power such as cover glass CG or the like is provided on the object side of the image forming plane IMG. These points are similar in each lens cross-sectional view shown in the other examples, so that the description thereof will be omitted below.

(2) Typical Numerical Values

Next, the typical numerical values to which the specific numerical values of the zoom lens are applied will be explained. Table 1 shows the surface data of the zoom lens. Referring to Table 1, "Surface Number" indicates the order of the lens surface counted in order from the object side, "r" indicates a radius of curvature of the lens surface, "d" indicates the distance on the optical axis of the lens surface, "Nd" indicates refractive index at the d-line (wavelength $\lambda$=587.6 nm), "vd" indicates Abbe number at the d-line, and "H" indicates effective radius. Also, "ASP" indicated in the column next to the surface number indicates that the lens surface is aspherical, and "S" indicates the aperture stop. Further, "D5," "D13," and the like indicated in the fields of the distance on the optical axis of the lens surface mean that the distance on the optical axis of the lens surface is a variable interval that varies at the time of changing focal length or focusing. Note that the unit of the lengths shown in the tables is millimeter "mm" and the unit of the image viewing angles is degree "°". Also, "0.0000" of the radius of curvature means a planar surface. Note that the 37th and 38th surfaces in Table 1 are the surface data of the cover glass CG.

Table 2 shows the specifications of the zoom lens. The specifications indicate the focal length "f" of the zoom lens at the time of focusing on infinity, F number "Fno," the half image viewing angle "$\omega$," image height "Y," and optical overall length "TL." Note that Table 2 shows the values of, in order from the left side, wide-angle end, intermediate focal length state, telephoto end, respectively.

Table 3 shows the variable interval on the optical axis of the zoom lens at the time of changing focal length. Table 3 indicates the values, in order from the left side, at the time of focusing on infinity at the wide-angle end, the intermediate focal length state, and the telephoto end, respectively. Note that "INF" in the table indicates "∞ (infinity)."

Table 4 shows the variable interval on the optical axis of the zoom lens at the time of focusing. Table 4 shows the values in the case where the shooting distance (imaging distance) is 380.00 mm, 400.00 mm, and 400.00 mm at the wide-angle end, the intermediate focal length state, and the telephoto end, respectively. These imaging distances are the shortest imaging distance in each focal length.

Table 5 shows a focal length of each of the lens groups configuring the zoom lens.

Table 6 shows an aspherical coefficient of each aspheric surfaces. The aspherical coefficient is a value in the case where the respective aspherical surfaces are defined in accordance with the following expression. Also, Table 25 shows the values of the conditional expressions (1) to (18).

$$X(Y) = CY^2/[1+\{1-(1+k) \times C^2 Y^2\}^{1/2}] + A4 \times Y^4 + A6 \times Y^6 + A8 \times Y^8 + A10 \times Y^{10} + A12 \times Y^{12}$$

where "E-a" in Table 6 indicates "$\times 10^{-a}$". Also, in the above-described expression, "X" indicates an amount of displacement from the reference plane in the direction along the optical axis, "C" indicates curvature at surface apex, "Y" is a height from the optical axis in a direction orthogonal to the optical axis, "K" indicates a conic coefficient, and "An" indicates n-th order aspherical coefficient.

These matters related to the tables are similar in each of the tables illustrated in the context of the other examples, so that the description thereof will be omitted below.

TABLE 1

| Surface Number | | r | d | Nd | vd | H |
|---|---|---|---|---|---|---|
| 1 | | 164.8841 | 1.300 | 2.00069 | 25.46 | 31.000 |
| 2 | | 106.9087 | 5.753 | 1.59282 | 68.62 | 30.327 |
| 3 | | 2049.3432 | 0.200 | | | 30.056 |
| 4 | | 64.4678 | 5.097 | 1.59282 | 68.62 | 28.300 |
| 5 | | 127.7370 | D5 | | | 27.808 |
| 6 | ASP | 66.2535 | 1.400 | 1.87483 | 41.12 | 18.405 |
| 7 | | 16.5245 | 8.916 | | | 13.821 |
| 8 | | −116.2454 | 0.800 | 1.85680 | 41.86 | 13.668 |
| 9 | | 56.4149 | 0.200 | | | 13.446 |
| 10 | | 61.8227 | 9.135 | 1.73319 | 26.22 | 13.451 |
| 11 | | −25.7135 | 0.300 | | | 13.288 |
| 12 | ASP | −22.4217 | 1.200 | 1.70845 | 51.27 | 13.182 |
| 13 | ASP | −103.8458 | D13 | | | 13.108 |
| 14 | S | 0.0000 | 1.200 | | | 8.858 |
| 15 | | 44.2087 | 3.473 | 1.69350 | 53.18 | 12.906 |
| 16 | ASP | −219.2615 | 1.536 | | | 12.944 |
| 17 | | −866.8618 | 0.800 | 1.84984 | 37.32 | 13.064 |
| 18 | | 94.5183 | 4.469 | 1.59282 | 68.62 | 13.156 |
| 19 | | −44.7943 | 0.300 | | | 13.283 |
| 20 | ASP | −82.7341 | 0.900 | 1.74007 | 48.57 | 13.312 |
| 21 | | 56.0779 | 2.635 | 1.84666 | 23.78 | 13.331 |
| 22 | | 183.1346 | 2.578 | | | 13.356 |
| 23 | | 41.0183 | 5.387 | 1.74192 | 48.43 | 13.775 |
| 24 | | −63.8393 | 0.200 | | | 13.624 |
| 25 | | −539.6209 | 0.800 | 1.97110 | 29.19 | 13.071 |
| 26 | | 20.6597 | 6.228 | 1.49700 | 81.61 | 12.253 |
| 27 | | −111.4492 | 0.238 | | | 12.264 |
| 28 | | 51.0216 | 5.332 | 1.61800 | 63.39 | 12.159 |
| 29 | | −79.8317 | D29 | | | 11.800 |
| 30 | | −139.9604 | 2.500 | 1.80809 | 22.76 | 9.380 |
| 31 | | −31.1560 | 0.900 | 1.69350 | 53.18 | 9.408 |
| 32 | ASP | 23.4283 | D32 | | | 9.411 |
| 33 | | 246.3353 | 7.306 | 1.59282 | 68.62 | 14.773 |
| 34 | | −27.2244 | 0.200 | | | 15.146 |
| 35 | | −31.7701 | 0.800 | 1.80897 | 38.14 | 15.013 |
| 36 | | −80.5852 | D36 | | | 15.522 |
| 37 | | 0.0000 | 2.000 | 1.51680 | 64.20 | 20.964 |
| 38 | | 0.0000 | 1.000 | | | 21.170 |

TABLE 2

| f | 24.695 | 59.995 | 101.989 |
|---|---|---|---|
| Fno | 4.119 | 4.120 | 4.119 |
| ω | 42.156 | 19.074 | 11.409 |
| Y | 21.633 | 21.633 | 21.633 |
| TL | 170.000 | 186.493 | 207.607 |

TABLE 3

| f | 24.695 | 59.995 | 101.989 |
|---|---|---|---|
| Shooting Distance | INF | INF | INF |
| D5 | 1.000 | 27.253 | 51.899 |
| D13 | 38.860 | 10.474 | 1.300 |
| D29 | 1.242 | 8.791 | 13.609 |
| D32 | 7.117 | 18.194 | 19.019 |
| D36 | 36.700 | 36.700 | 36.700 |

TABLE 4

| Shooting Distance | 380.000 | 400.000 | 400.000 |
|---|---|---|---|
| D29 | 1.825 | 11.176 | 19.899 |
| D32 | 6.535 | 15.809 | 12.728 |

TABLE 5

| Group | Surface Number | Focal Length |
|---|---|---|
| G1 | 1-5 | 150.486 |
| G2 | 6-13 | −21.265 |
| G3 | 14-29 | 27.830 |
| G4 | 30-32 | −31.313 |
| G5 | 33-36 | 114.076 |

TABLE 6

| Surface Number | K | A4 | A6 | A8 | A10 | A12 |
|---|---|---|---|---|---|---|
| 6 | 0 | −1.8735E−06 | 2.9593E−09 | −1.3867E−11 | 1.5854E−14 | −8.4316E−18 |
| 12 | 0 | 3.0985E−05 | −3.0498E−07 | 2.1696E−09 | −7.7151E−12 | 1.1327E−14 |
| 13 | 0 | 1.7444E−05 | −3.0958E−07 | 2.0521E−09 | −7.3574E−12 | 1.0024E−14 |
| 16 | 0 | 1.2534E−05 | −6.6064E−09 | 8.6021E−11 | −4.2944E−13 | 9.2479E−16 |
| 20 | 0 | 2.1197E−06 | −8.9016E−09 | 6.0935E−11 | −2.0221E−13 | 2.6903E−16 |
| 32 | 0 | 1.9583E−06 | 1.0589E−08 | −4.3641E−10 | 3.7956E−12 | −1.3630E−14 |

Figure 2:
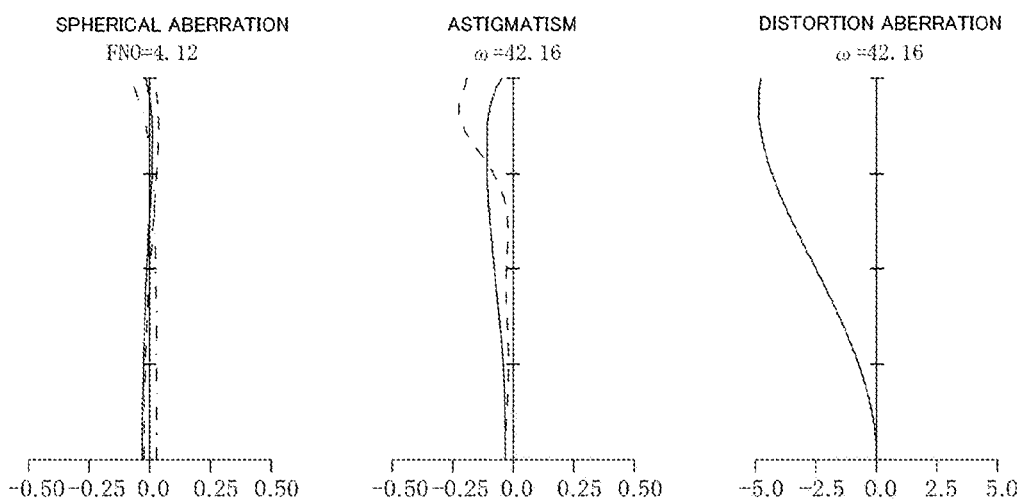
FIG. 2 illustrates a spherical aberration graph, an astigmatism graph, and a distortion graph of the zoom lens of Example 1 at the time of focusing on infinity at the wide-angle end.
Figure 3:
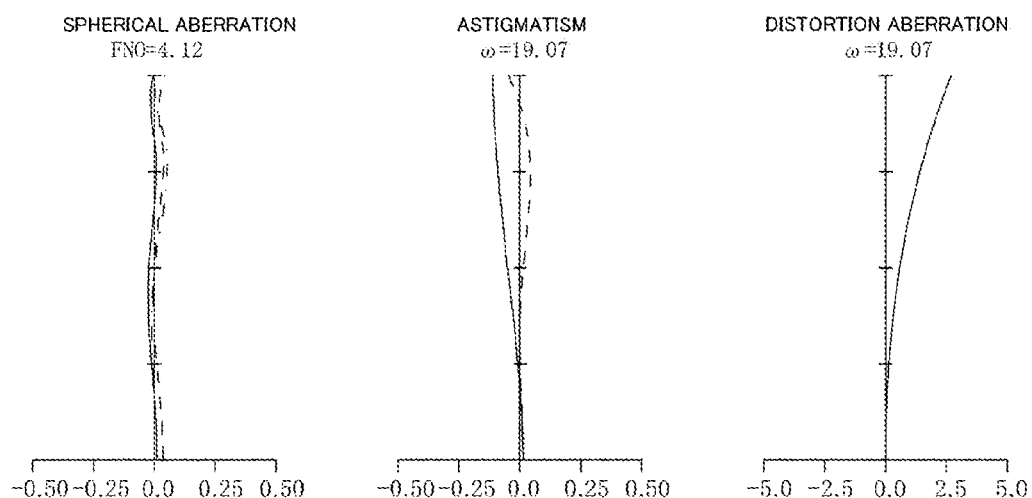
FIG. 3 illustrates a spherical aberration graph, an astigmatism graph, and a distortion graph of the zoom lens of Example 1 at the time of focusing on infinity in an intermediate focal length state.
Figure 4:
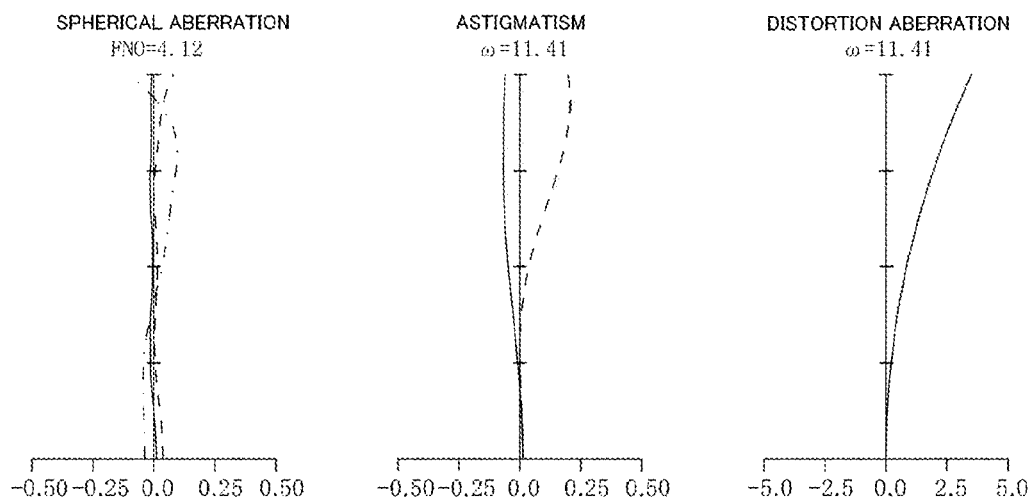
FIG. 4 illustrates a spherical aberration graph, an astigmatism graph, and a distortion graph of the zoom lens of Example 1 at the time of focusing on infinity at the telephoto end.

Also, FIGS. 2 to 4 show the longitudinal aberration diagrams of the zoom lens of Example 1 at the time of focusing on infinity at the wide-angle end, in the intermediate focal length state, and at the telephoto end, respectively. In the longitudinal aberration diagram illustrated in each of these figures, spehrical aberration (mm), astigmatism (mm), and distortion aberration (%) are indicated in order from the left side of each figure. In the figure illustrating the spehrical aberration, the vertical axis indicates the proportion with respect to the open F-value and the horizontal axis indicates the defocusing, where the solid line indicates the d-line (wavelength λ=587.6 nm), the dash-dotted line indicates the g-line (wavelength λ=435.8 nm), and the dotted line indicates the spherical aberration on the C-line (wavelength λ=656.3 nm). In the diagram illustrating astigmatism, the image height is indicated on the vertical axis and the defocusing on the horizontal axis, where the solid line indicates the sagittal image plane (ds) at the d-line and the dotted line indicates the meridional image plane (dm) at the d-line. In the diagram illustrating the distortion aberration, the image height is indicated on the vertical axis and percentage on the horizontal axis, where the distortion aberration is indicated. These matters related to the longitudinal aberration diagram are similar in each of the longitudinal aberration diagrams illustrated in the context of the other examples, so that the description thereof will be omitted below.

Also, the backfocus "fb" of the zoom lens at the time of focusing on infinity at the wide-angle end is as described below. Note that the following value is a value that does not include the cover glass (Nd=1.5168) and is also applicable to the backfocus illustrated in the other examples.

$$fb = 39.019 (mm)$$

Example 2

(1) Optical Construction of the Zoom Lens

Figure 5:
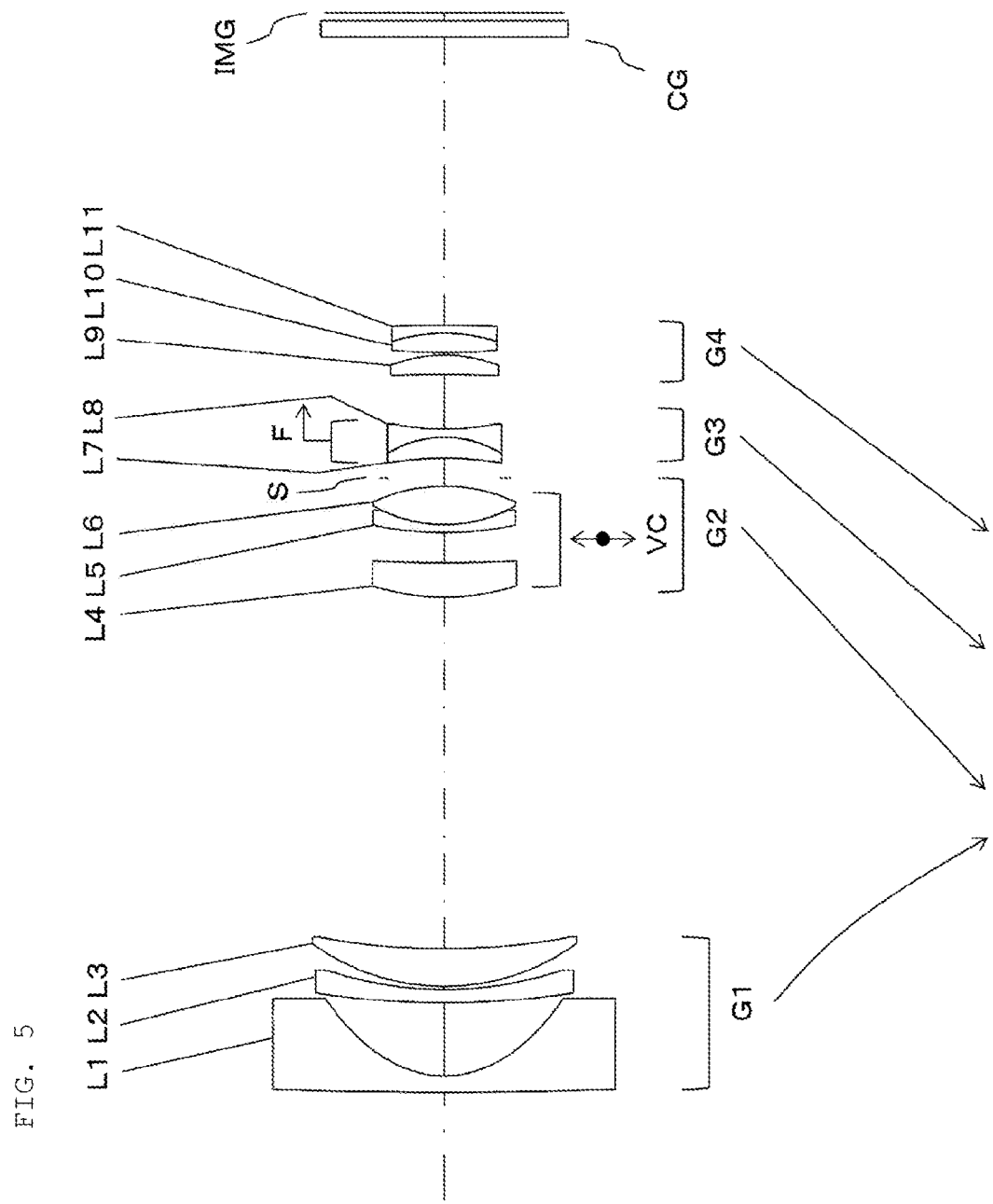
FIG. 5 is a cross-sectional view illustrating an example lens construction of a zoom lens of Example 2 of the present invention at the time of focusing on infinity at a wide-angle end.

FIG. 5 is a lens cross-sectional view that illustrates the lens construction of the zoom lens of Example 2 according to the present invention at the time of focusing on infinity at the wide-angle end. The zoom lens is composed of, in order from the object side, the first lens group G1 having a negative refractive power, the second lens group G2 having a positive refractive power, the third lens group G3 having a negative refractive power, and the fourth lens group G4 having a positive refractive power. At the time of focusing from an infinity object to a close object, the third lens group G3 moves toward the image along the optical axis. The aperture stop S is arranged to be closest to the image side in the second lens group G2. According to this example, the front group is composed of the first lens group G1, and the rear group is composed of the second lens group G2, the third lens group G3, and the fourth lens group G4. The distance between the first lens group G1 and the second lens group G2 is the "widest air interval at the wide-angle end."

The construction of the respective lens groups will be described below. The first lens group G1 is composed of, in order from the object side, an object-side convex negative meniscus lens L1, an object-side convex negative meniscus lens L2, and an object-side convex positive meniscus lens L3. The image-side surface of the negative meniscus lens L1 is aspherical.

The second lens group G2 is composed of, in order from the object side, a cemented lens obtained by cementing an object-side convex positive meniscus lens L4, an object-side convex negative meniscus lens L5, and a biconvex lens L6, and an aperture stop S. The two surfaces of the positive meniscus lens L4 are aspherical. The negative meniscus lens L5 corresponds to the above-described lens Lrn. Also, ΔPgF of the negative meniscus lens L5 is 0.0137.

The third lens group G3 is composed of, in order from the object side, a cemented lens obtained by cementing an image-side convex positive meniscus lens L7 and a biconcave lens L8. The third lens group G3 is only composed of a cemented lens having a negative refractive power, the positive meniscus lens L7 corresponds to the above-described lens Lp, and the biconcave lens L8 corresponds to the above-described lens Ln.

The fourth lens group G4 is composed of, in order from the object side, an image-side convex positive meniscus lens L9, and a cemented lens obtained by cementing a biconvex lens L10 and an object-side concave negative meniscus lens L11. The positive meniscus lens L9 corresponds to the above-described lens Lrp. Also, ΔPgFp of the positive meniscus lens L9 is 0.0375. Also, the object-side surface of the negative meniscus lens L11 corresponds to the above-described lens surface Sr.

According to the zoom lens of Example 2, at the time of changing focal length from the wide-angle end to the telephoto end, the first lens group G1 moves toward the image with respect to the image plane, the second lens group G2 moves toward the object, the third lens group G3 moves toward the object, the fourth lens group G4 moves toward the object.

When an image blur occurs due to a hand-shake etc. at the time of imaging, the second lens group G2 is defined as the vibration-proof group, the vibration-proof group is moved in a direction generally perpendicular to the optical axis to shift the image, and thus the image blur correction is performed. Note that the negative meniscus lens L5 corresponds to the above-described lens Lvcn, and the positive meniscus lens L4 and the biconvex lens L6 correspond to the above-described lens Lvcp. Note that the value (37.770) of the conditional expression (3) in Table 25 is the value in the case where the Abbe number of the biconvex lens L6 is given as vdLvcp. The value of the conditional expression (3) in the case where the Abbe number of the positive meniscus lens L4 is given as vdLvcp is 37.890. Also, the two surfaces of positive meniscus lens L4 are aspherical and the object-side surface has an aspherical shape that causes the refractive power to be smaller than the refractive power determined from the paraxial radius of curvature.

(2) Typical Numerical Values

Next, the typical numerical values to which the specific numerical values of the zoom lens are applied will be explained. Table 7 shows the surface data of the zoom lens, and Table 8 shows the specifications of the zoom lens. Note that the 21st and 22nd surfaces in Table 7 are the surface data of the cover glass CG.

Table 9 shows the variable interval on the optical axis of the zoom lens at the time of changing focal length, and Table 10 shows the variable interval on the optical axis of the zoom lens at the time of focusing. Note that Table 10 shows the values in the cases where the respective shooting distances (imaging distance) are 230.00 mm, 250.00 mm, and 250.00 mm, respectively, at the wide-angle end, the intermediate focal length state, and the telephoto end, respectively. These imaging distances are the shortest imaging distance in each focal length.

Table 11 shows a focal length of each of the lens groups of which the zoom lens is composed. Table 12 shows an aspherical coefficient of each aspheric surfaces. Also, Table 25 shows the values of the conditional expressions (1) to (18).

Figure 6:
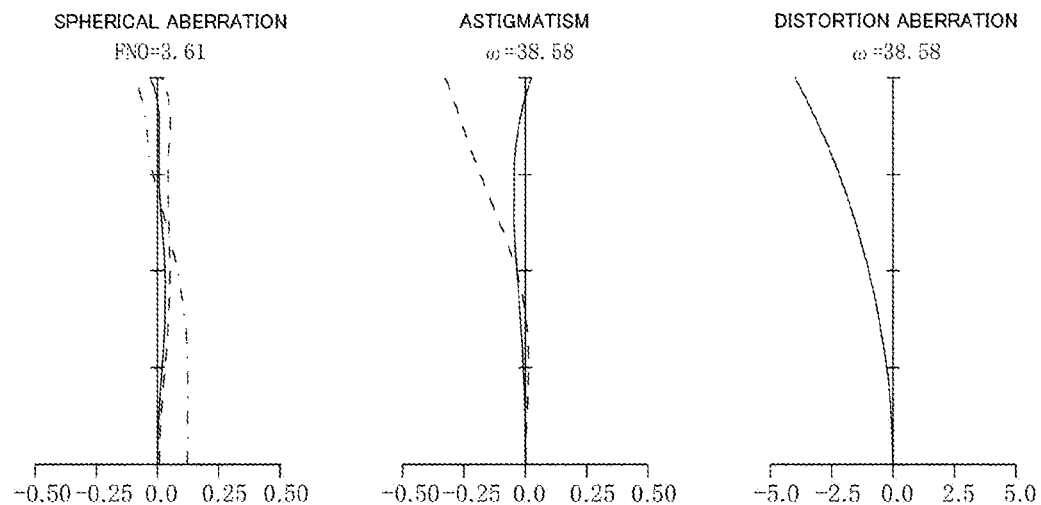
FIG. 6 illustrates a spherical aberration graph, an astigmatism graph, and a distortion graph of the zoom lens of Example 2 at the time of focusing on infinity at the wide-angle end.
Figure 7:
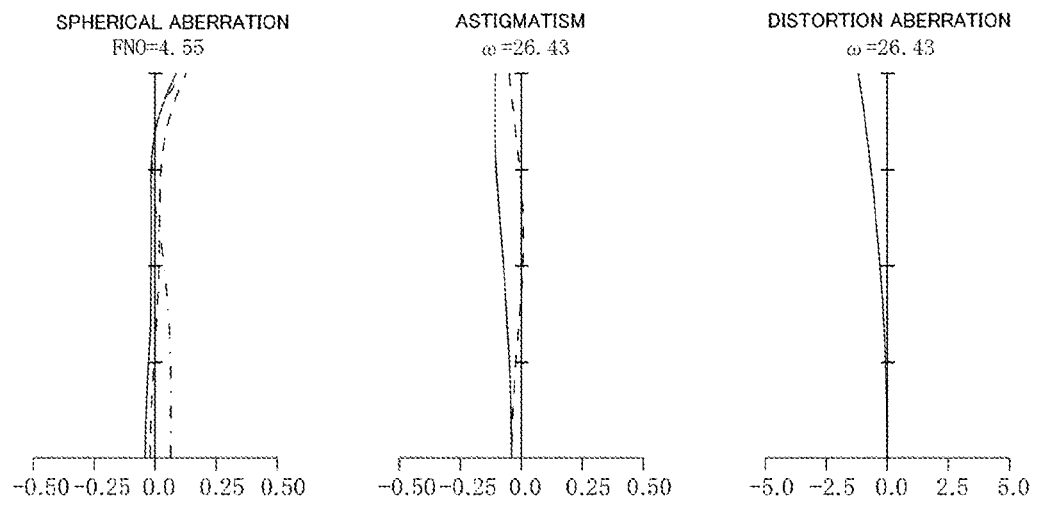
FIG. 7 illustrates a spherical aberration graph, an astigmatism graph, and a distortion graph of the zoom lens of Example 2 at the time of focusing on infinity in an intermediate focal length state.
Figure 8:
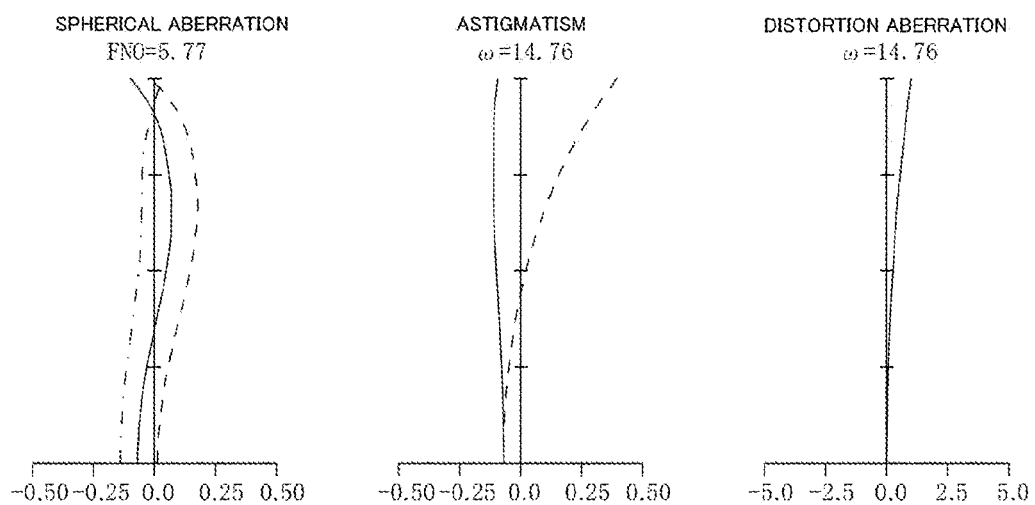
FIG. 8 illustrates a spherical aberration graph, an astigmatism graph, and a distortion graph of the zoom lens of Example 2 at the time of focusing on infinity at the telephoto end.

Also, FIGS. 6 to 8 illustrate the longitudinal aberration diagram at the time of focusing on infinity in the wide-angle end, the intermediate focal length state, and the telephoto end, respectively, of the zoom lens of Example 2.

Further, the backfocus of the zoom lens at the time of focusing on infinity at the wide-angle end is as follows:

*fb*=38.002(*mm*)

TABLE 7

| Surface Number | | r | d | Nd | vd | H |
|---|---|---|---|---|---|---|
| 1 | | 664.2203 | 2.000 | 1.59201 | 67.02 | 19.685 |
| 2 | ASP | 12.4206 | 9.063 | | | 14.659 |
| 3 | | 99.0474 | 1.700 | 1.83400 | 37.34 | 14.679 |

TABLE 7-continued

| Surface Number | | r | d | Nd | vd | H |
|---|---|---|---|---|---|---|
| 4 | | 44.9342 | 0.382 | | | 14.536 |
| 5 | | 27.4552 | 4.648 | 1.76182 | 26.61 | 15.052 |
| 6 | | 82.1402 | D6 | | | 14.800 |
| 7 | ASP | 27.5225 | 4.248 | 1.61881 | 63.85 | 8.001 |
| 8 | ASP | 341.9552 | 3.733 | | 7.928 | |
| 9 | | 41.6779 | 1.000 | 1.84666 | 23.78 | 7.889 |
| 10 | | 17.5890 | 4.766 | 1.51680 | 64.20 | 7.701 |
| 11 | | −20.4065 | 1.000 | | | 7.687 |
| 12 | S | 0.0000 | D12 | | | 6.788 |
| 13 | | −43.8890 | 2.597 | 1.84666 | 23.78 | 6.245 |
| 14 | | −13.2199 | 1.000 | 1.80420 | 46.50 | 6.132 |
| 15 | | 29.7835 | D15 | | | 5.859 |
| 16 | | −217.0738 | 2.391 | 1.49700 | 81.61 | 5.867 |
| 17 | | −18.3135 | 0.300 | | | 5.905 |
| 18 | | 63.0476 | 2.475 | 1.49700 | 81.61 | 5.747 |
| 19 | | −21.3360 | 1.000 | 1.83481 | 42.72 | 5.607 |
| 20 | | −161.5834 | D20 | | | 5.569 |
| 21 | | 0.0000 | 2.000 | 1.51680 | 64.20 | 13.865 |
| 22 | | 0.0000 | 1.000 | | | 14.225 |

TABLE 8

| f | 18.538 | 28.896 | 53.339 |
|---|---|---|---|
| Fno | 3.605 | 4.550 | 5.767 |
| ω | 38.587 | 26.428 | 14.755 |
| Y | 14.200 | 14.200 | 14.200 |
| TL | 133.849 | 122.674 | 120.000 |

TABLE 9

| f | 18.538 | 28.896 | 53.339 |
|---|---|---|---|
| Shooting Distance | INF | INF | INF |
| D6 | 43.626 | 20.912 | 1.273 |
| D12 | 2.450 | 4.207 | 10.084 |
| D15 | 6.788 | 8.311 | 7.450 |
| D20 | 35.683 | 43.942 | 55.891 |

TABLE 10

| Shooting Distance | 230.000 | 250.000 | 250.000 |
|---|---|---|---|
| D12 | 3.300 | 5.738 | 15.028 |
| D15 | 5.938 | 6.780 | 2.500 |

TABLE 11

| Group | Surface Number | Focal Length |
|---|---|---|
| G1 | 1-6 | −28.619 |
| G2 | 7-12 | 23.772 |
| G3 | 13-15 | −22.745 |
| G4 | 16-20 | 44.047 |

TABLE 12

| Surface Number | K | A4 | A6 | A8 | A10 | A12 |
|---|---|---|---|---|---|---|
| 2 | −0.864 | 9.3680E−06 | 2.0539E−09 | 4.6218E−11 | 7.4937E−15 | 0.0000E+00 |
| 7 | 0 | −1.1011E−05 | 5.5255E−08 | −2.4435E−09 | 0.0000E+00 | 0.0000E+00 |
| 8 | 0 | 2.2843E−05 | 7.6512E−08 | −2.5280E−09 | 0.0000E+00 | 0.0000E+00 |

Example 3

(1) Optical Construction of the Zoom Lens

Figure 9:
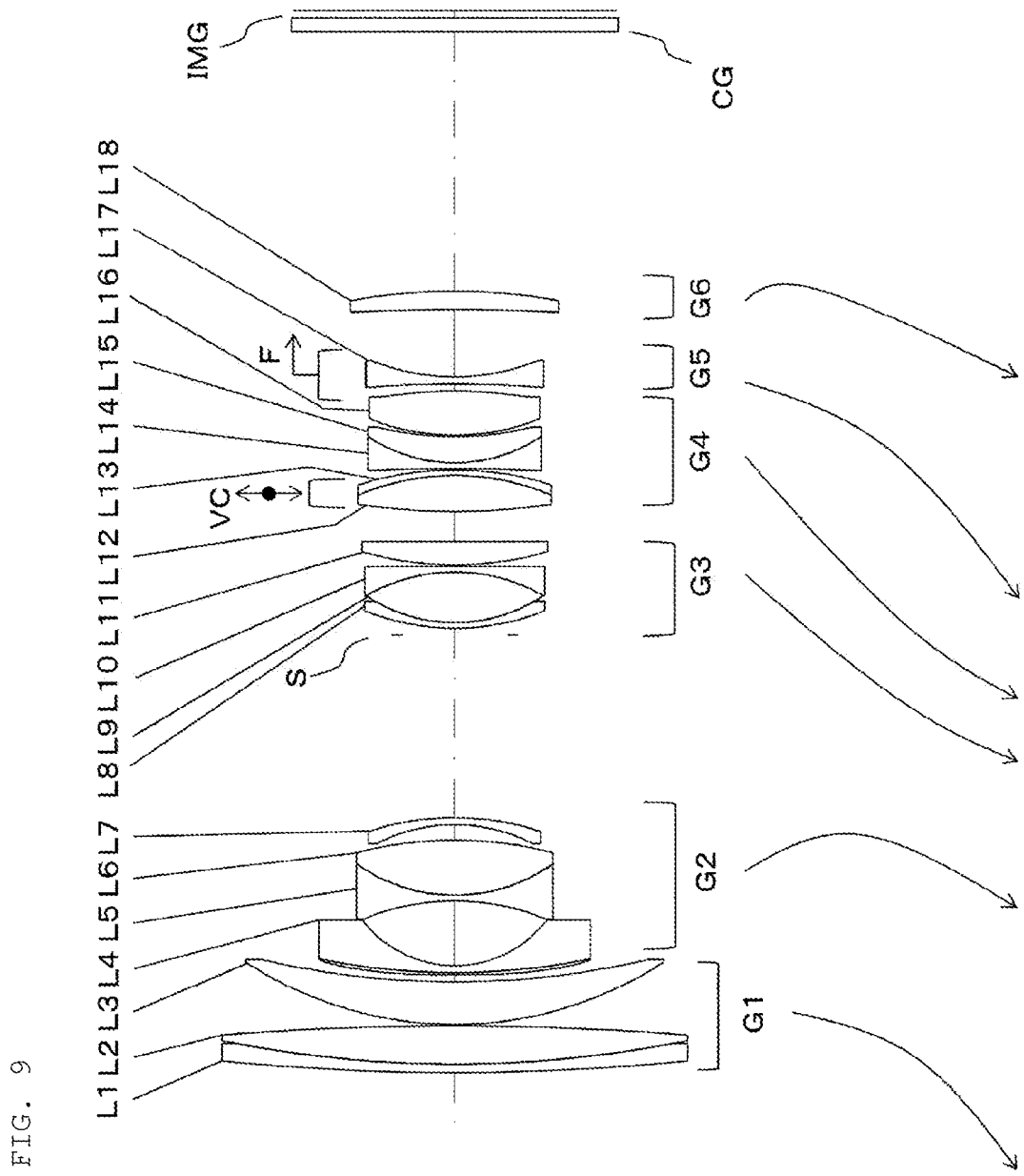
FIG. 9 is a cross-sectional view illustrating an example lens construction of a zoom lens of Example 3 of the present invention at the time of focusing on infinity at a wide-angle end.

FIG. 9 is a lens cross-sectional view that illustrates the lens construction of the zoom lens of Example 3 according to the present invention at the time of focusing on infinity at the wide-angle end. The zoom lens is composed of, in order from the object side, the first lens group G1 having a positive refractive power, the second lens group G2 having a negative refractive power, the third lens group G3 having a positive refractive power, the fourth lens group G4 having a positive refractive power, the fifth lens group G5 having a negative refractive power, and the sixth lens group G6 having a positive refractive power. At the time of focusing from the infinity object to the close object, the fifth lens group G5 moves toward the image along the optical axis. The aperture stop S is arranged to be closest to the object side in the third lens group G3. According to Example 3, the front group is composed of the first lens group G1 and the second lens group G2, and the rear group is composed of the third lens group G3, the fourth lens group G4, the fifth lens group G5, and the sixth lens group G6. The distance between the second lens group G2 and the third lens group G3 is the "widest air interval at the wide-angle end."

The construction of the respective lens groups will be described below. The first lens group G1 is composed of, in order from the object side, a cemented lens obtained by cementing an object-side convex negative meniscus lens L1 and a convex lens L2, and an object-side convex positive meniscus lens L3.

The second lens group G2 is composed of, in order from the object side, object-side convex negative meniscus lens L4, a cemented lens obtained by cementing a biconcave lens L5 and a biconvex lens L6, and an object-side concave negative meniscus lens L7. The object-side surface of the negative meniscus lens L4 is aspherical, and the two surfaces of negative meniscus lens L7 are aspherical.

The third lens group G3 is composed of, in order from the object side, an aperture stop S, a cemented lens obtained by cementing three lenses, i.e., an object-side convex negative meniscus lens L8, a biconvex lens L9, and an object-side concave negative meniscus lens L10, and a biconvex lens L11. The biconvex lens L11 corresponds to the above-described lens Lp. Also, biconvex lens L9 corresponds to the above-described lens Lrp. ΔPgF of the biconvex lens L9 is 0.0194.

The fourth lens group G4 is composed of, in order from the object side, a cemented lens obtained by cementing a biconvex lens L12 and an object-side concave negative meniscus lens L13, a cemented lens obtained by cementing a biconcave lens L14 and an image-side convex positive meniscus lens L15, and a biconvex lens L16. The object-side surface of the biconvex lens L12 is aspherical, and the two surfaces of biconvex lens L16 are aspherical. The biconcave lens L14 corresponds to the above-described lens Lrn, and the positive meniscus lens L15 corresponds to the above-described lens Lrp. ΔPgF of the biconcave lens L14 is 0.0036, and ΔPgFp of the positive meniscus lens L15 is 0.0194.

The fifth lens group G5 is composed of a biconcave lens L17 whose two surfaces are aspherical. That is, the fifth lens group G5 is only composed of one single lens having a negative refractive power and the biconcave lens L17 corresponds to the above-described lens Ln.

The sixth lens group G6 is composed of an image-side convex positive meniscus lens L18. The object-side surface of the positive meniscus lens L18 corresponds to the above-described lens surface Sr.

According to the zoom lens of Example 3, at the time of changing focal length from the wide-angle end to the telephoto end, the first lens group G1 moves toward the object with reference to the image plane the second lens group G2 moves toward the image and then moves toward the object, the third lens group G3 moves toward the object, the fourth lens group G4 moves toward the object, the fifth lens group G5 moves toward the object, the sixth lens group G6 moves toward the image and then moves toward the object.

When an image blur occurs due to a hand-shake etc. at the time of imaging, the cemented lens obtained by cementing the biconvex lens L12 and the object-side concave negative meniscus lens L13 included in the fourth lens group G4 is defined as the vibration-proof group, the vibration-proof group is moved in a direction generally perpendicular to the optical axis to shift the image, and thus the image blur correction is performed. Note that negative meniscus lens L13 corresponds to the above-described lens Lvcn and the biconvex lens L12 corresponds to the above-described lens Lvcp. Also, the object-side surface of the biconvex lens L12 has an aspherical shape that causes the refractive power to be smaller than the refractive power determined from the paraxial radius of curvature.

(2) Typical Numerical Values

Next, the typical numerical values to which the specific numerical values of the zoom lens are applied will be explained. Table 13 shows the surface data of the zoom lens, and Table 14 shows the specifications of the zoom lens. Note that the 33rd and 34th surfaces in Table 13 are the surface data of the cover glass CG.

Table 15 shows the variable interval on the optical axis of the zoom lens at the time of changing focal length, and Table 16 shows the variable interval on the optical axis of the zoom lens at the time of focusing. Note that Table 16 shows the values in the case where the shooting distance (imaging distance) is 380.00 mm, 400.00 mm, and 400.00 mm at the wide-angle end, the intermediate focal length state, and the telephoto end, respectively. These imaging distances are the shortest imaging distance in each focal length.

Table 17 shows a focal length of each of the lens groups configuring the zoom lens. Table 18 shows an aspherical coefficient of each aspheric surfaces. Also, Table 25 shows the values of the conditional expressions (1) to (18).

Figure 10:
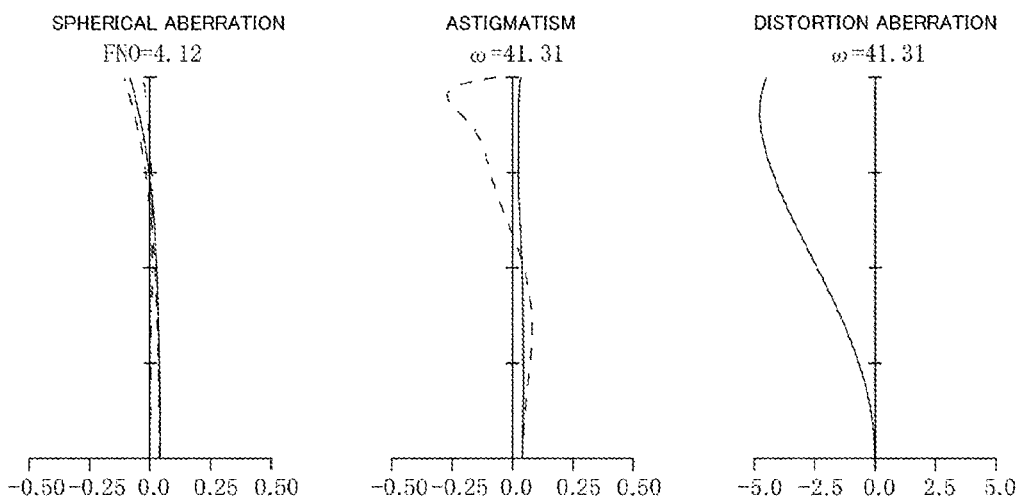
FIG. 10 illustrates a spherical aberration graph, an astigmatism graph, and a distortion graph of the zoom lens of Example 3 at the time of focusing on infinity at the wide-angle end.
Figure 11:
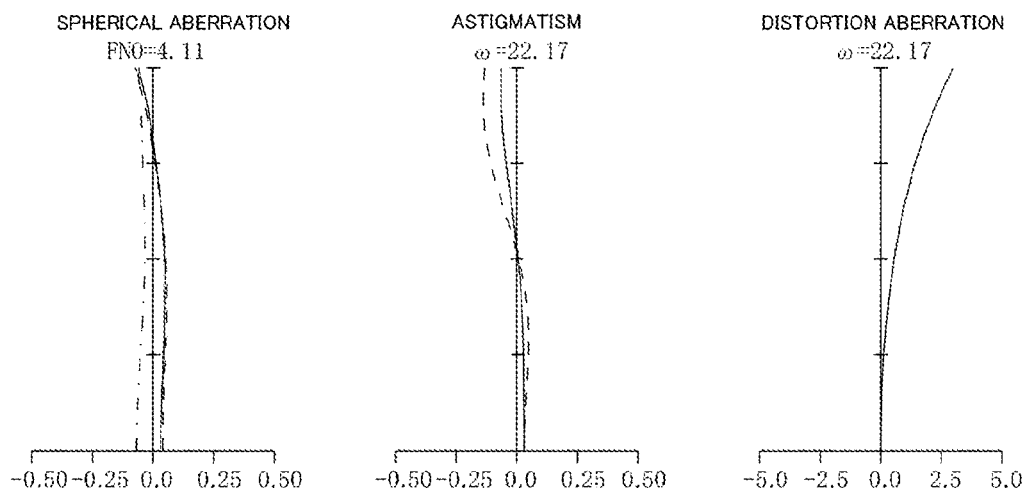
FIG. 11 illustrates a spherical aberration graph, an astigmatism graph, and a distortion graph of the zoom lens of Example 3 at the time of focusing on infinity in an intermediate focal length state.
Figure 12:
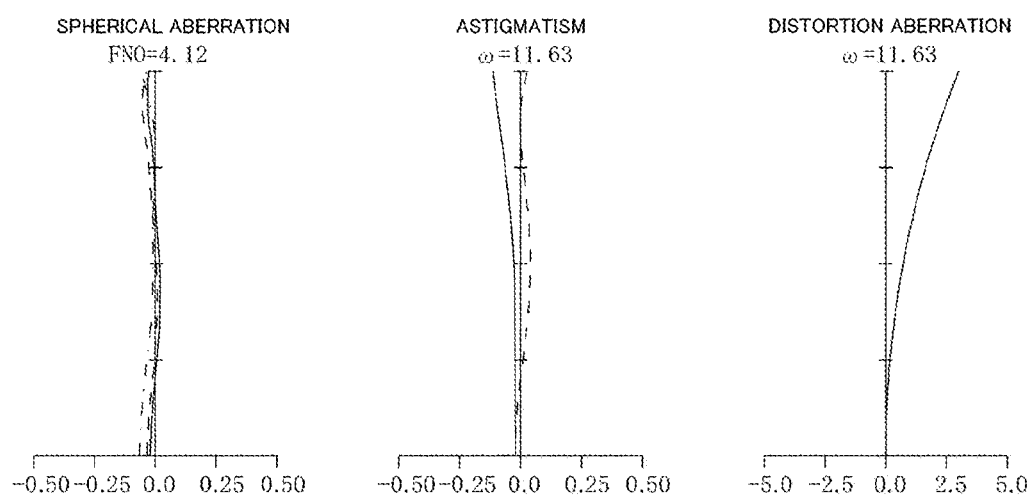
FIG. 12 illustrates a spherical aberration graph, an astigmatism graph, and a distortion graph of the zoom lens of Example 3 at the time of focusing on infinity at the telephoto end.

Also, FIGS. 10 to 12 show the longitudinal aberration diagram at the time of focusing on infinity at the wide-angle end, in the intermediate focal length state, and at the telephoto end, respectively, of the zoom lens of Example 3.

Further, the backfocus of the zoom lens at the time of focusing on infinity at the wide-angle end is as follows:

$fb=39.000(mm)$

TABLE 13

| Surface Number | | r | d | Nd | vd | H |
|---|---|---|---|---|---|---|
| 1 | | 323.7548 | 1.200 | 1.92119 | 23.96 | 31.000 |
| 2 | | 162.8221 | 5.378 | 1.59282 | 68.62 | 30.511 |
| 3 | | −416.6201 | 0.200 | | | 30.309 |
| 4 | | 52.5783 | 6.103 | 1.59282 | 68.62 | 27.700 |
| 5 | | 117.8837 | D5 | | | 27.204 |
| 6 | ASP | 205.3924 | 0.300 | 1.51460 | 49.96 | 17.800 |
| 7 | | 92.8554 | 1.000 | 1.72916 | 54.67 | 17.549 |
| 8 | | 16.2034 | 9.149 | | | 12.854 |
| 9 | | −33.2034 | 0.800 | 1.49700 | 81.61 | 12.685 |
| 10 | | 23.5127 | 7.798 | 1.72047 | 34.71 | 11.846 |
| 11 | | −53.7846 | 2.177 | | | 11.330 |
| 12 | ASP | −24.1046 | 1.000 | 1.85135 | 40.10 | 11.000 |
| 13 | ASP | −39.5928 | D13 | | | 11.078 |
| 14 | S | 0.0000 | 1.000 | | | 7.350 |
| 15 | | 33.5262 | 0.800 | 2.00100 | 29.13 | 11.263 |
| 16 | | 22.1705 | 7.146 | 1.59282 | 68.62 | 11.130 |
| 17 | | −24.7861 | 0.800 | 1.80610 | 40.73 | 11.214 |
| 18 | | −1553.7806 | 0.200 | | | 11.601 |
| 19 | | 45.5555 | 3.337 | 1.94595 | 17.98 | 11.975 |
| 20 | | −11420.0602 | D20 | | | 11.917 |
| 21 | ASP | 73.0633 | 5.117 | 1.59282 | 68.62 | 11.798 |
| 22 | | −34.4056 | 0.800 | 1.94595 | 17.98 | 11.608 |
| 23 | | −44.4387 | 0.200 | | | 12.500 |
| 24 | | −252.4796 | 0.800 | 2.00100 | 29.13 | 11.189 |
| 25 | | 21.7316 | 3.716 | 1.59282 | 68.62 | 10.757 |
| 26 | | 44.7795 | 0.200 | | | 10.768 |
| 27 | ASP | 32.9204 | 6.239 | 1.82098 | 42.50 | 10.900 |
| 28 | ASP | −56.3856 | D28 | | | 10.951 |
| 29 | ASP | −177.3325 | 1.000 | 1.59201 | 67.02 | 11.450 |
| 30 | ASP | 29.2491 | D30 | | | 11.132 |
| 31 | | −331.6955 | 2.594 | 1.87070 | 40.73 | 13.305 |
| 32 | | −82.1148 | D32 | | | 13.500 |
| 33 | | 0.0000 | 2.000 | 1.51680 | 64.20 | 21.332 |
| 34 | | 0.0000 | 1.000 | | | 21.528 |

TABLE 14

| f | 25.752 | 51.482 | 101.851 |
|---|---|---|---|
| Fno | 4.123 | 4.108 | 4.120 |
| ω | 41.307 | 22.170 | 11.633 |
| Y | 21.633 | 21.633 | 21.633 |
| TL | 150.364 | 161.368 | 203.864 |

TABLE 15

| f | 25.752 | 51.482 | 101.851 |
|---|---|---|---|
| Shooting Distance | INF | INF | INF |
| D5 | 1.000 | 17.096 | 42.593 |
| D13 | 25.849 | 6.747 | 1.000 |
| D20 | 4.201 | 2.583 | 1.000 |
| D28 | 0.997 | 5.217 | 1.003 |
| D30 | 9.581 | 13.836 | 20.242 |
| D32 | 36.681 | 43.834 | 65.971 |

TABLE 16

| Shooting Distance | 380.000 | 400.000 | 400.000 |
|---|---|---|---|
| D28 | 1.933 | 7.951 | 7.855 |
| D30 | 8.645 | 11.101 | 13.390 |

TABLE 17

| Group | Surface Number | Focal Length |
|---|---|---|
| G1 | 1-5 | 114.642 |
| G2 | 6-13 | −20.988 |
| G3 | 14-20 | 42.458 |
| G4 | 21-28 | 45.184 |
| G5 | 29-30 | −42.335 |
| G6 | 31-32 | 124.734 |

TABLE 18

| Surface Number | K | A4 | A6 | A8 | A10 | A12 |
|---|---|---|---|---|---|---|
| 6 | 0 | 1.2837E−05 | −2.1442E−08 | 5.5949E−11 | −1.1996E−13 | 1.5377E−16 |
| 12 | 0 | −8.7531E−06 | 8.6202E−08 | −3.3258E−10 | 5.1244E−13 | −9.3573E−16 |
| 13 | 0 | −9.7742E−06 | 7.6139E−08 | −3.0250E−10 | 3.5047E−13 | 0.0000E+00 |
| 21 | 0 | −5.5002E−06 | −1.6789E−08 | 8.7410E−11 | −3.4776E−13 | 7.7049E−16 |
| 27 | 0 | −3.5514E−06 | 2.9946E−08 | 3.3719E−10 | −1.8317E−12 | 1.2820E−14 |
| 28 | 0 | 7.9983E−06 | −1.0254E−09 | 7.7608E−10 | −5.3802E−12 | 2.7034E−14 |
| 29 | 0 | −1.2178E−05 | 1.5756E−07 | −1.0359E−09 | 2.8436E−12 | 0.0000E+00 |
| 30 | 0 | −1.5518E−05 | 1.5764E−07 | −1.0926E−09 | 2.8672E−12 | 2.0668E−15 |

Example 4

(1) Optical Construction of the Zoom Lens

Figure 13:
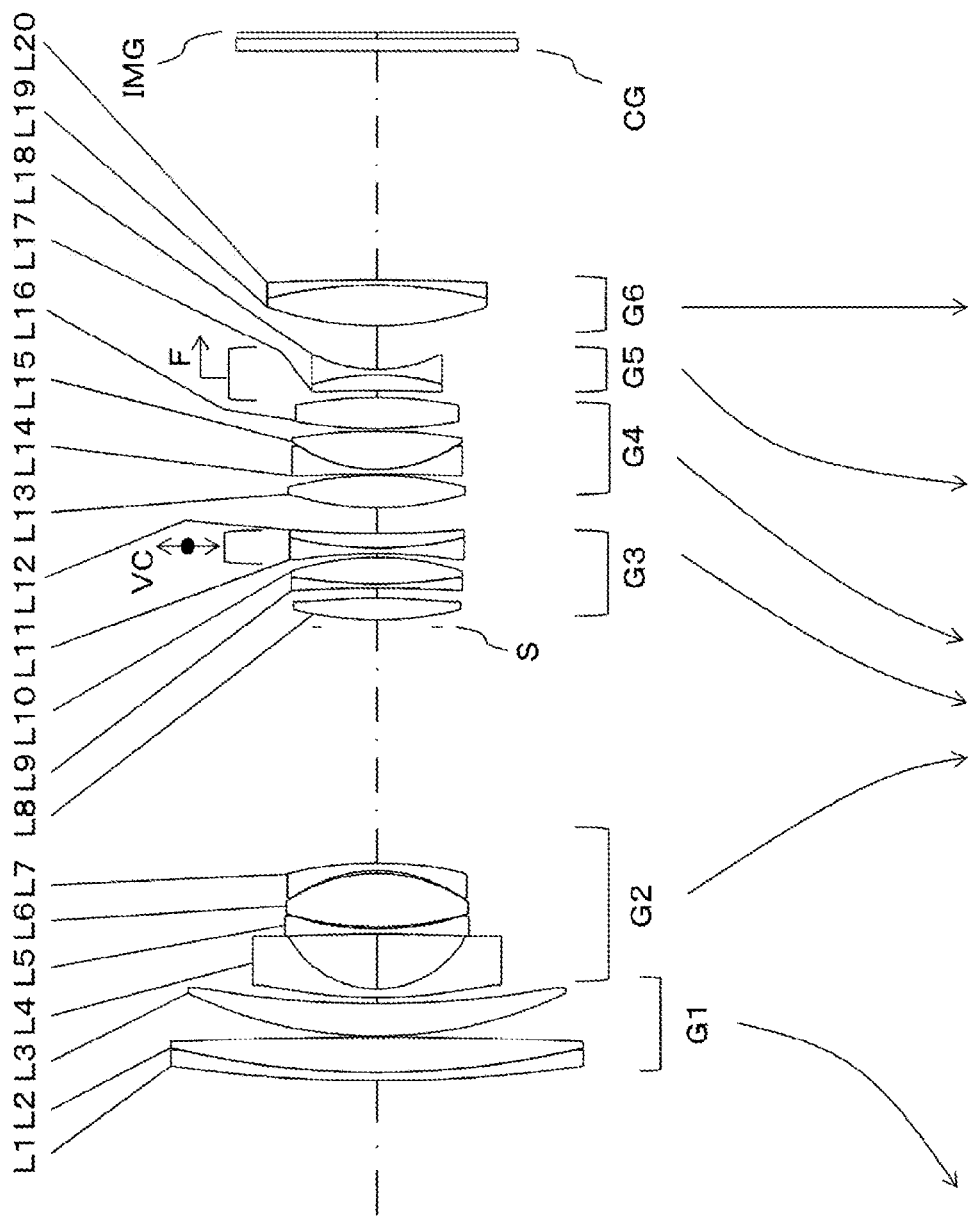
FIG. 13 is a cross-sectional view illustrating an example lens construction of a zoom lens of Example 4 of the present invention at the time of focusing on infinity at a wide-angle end.

FIG. 13 is a cross-sectional view of the lens that illustrates a lens construction of the zoom lens of Example 4 at the time of focusing on infinity at the wide-angle end. The zoom lens is composed of, in order from the object side, the first lens group G1 having a positive refractive power, the second lens group G2 having a negative refractive power, the third lens group G3 having a positive refractive power, the fourth lens group G4 having a positive refractive power, the fifth lens group G5 having a negative refractive power, and the sixth lens group G6 having a positive refractive power. At the time of focusing from an infinity object to a close object, the fifth lens group G5 moves toward the image along the optical axis. The aperture stop S is arranged to be closest to the object side in the third lens group G3. According to this example, the front group is composed of the first lens group G1 and the second lens group G2, and the rear group is composed of the third lens group G3, the fourth lens group G4, the fifth lens group G5, and the sixth lens group G6. The distance between the second lens group G2 and the third lens group G3 is the "widest air interval at the wide-angle end."

The construction of the respective lens groups will be described below. The first lens group G1 is composed of, in order from the object side, a cemented lens obtained by cementing an object-side convex negative meniscus lens L1 and a convex lens L2, and an object-side convex positive meniscus lens L3.

The second lens group G2 is composed of, in order from the object side, an object-side convex negative meniscus lens L4, a biconcave lens L5, a biconvex lens L6, and an object-side concave negative meniscus lens L7. The object-side surface of the negative meniscus lens L4 is aspherical, and the two surfaces of negative meniscus lens L7 are aspherical.

The third lens group G3 is composed of, in order from the object side, an aperture stop S, a biconvex lens L8, a cemented lens obtained by cementing a biconcave lens L9 and a biconvex lens L10, and a cemented lens obtained by cementing a biconcave lens L11 and an object-side convex positive meniscus lens L12. The image-side surface of the biconvex lens L8 and the object-side surface of the biconcave lens L11 are aspherical. The biconvex lens L10 corresponds to the above-described lens Lrp. Also, ΔPgFp of the biconvex lens L10 is 0.0194.

The fourth lens group G4 is composed of, in order from the object side, a biconvex lens L13, a cemented lens obtained by cementing a biconcave lens L14 and a biconvex lens L15, and a biconvex lens L16. The biconcave lens L14 corresponds to the above-described lens Lrn and the biconvex lens L15 corresponds to the above-described lens Lrp. ΔPgF of the biconcave lens L14 is 0.000 and ΔPgFp of the biconvex lens L15 is 0.0375.

The fifth lens group G5 is composed of, in order from the object side, a cemented lens obtained by cementing an image-side convex positive meniscus lens L17 and a biconcave lens L18. The fifth lens group G5 is only composed of a cemented lens having a negative refractive power, the positive meniscus lens L17 corresponds to the above-described lens Lp, and the biconcave lens L18 corresponds to the above-described lens Ln.

The sixth lens group G6 is composed of, in order from the object side, a cemented lens obtained by cementing a biconvex lens L19 and an object-side concave negative meniscus lens L20.

According to the zoom lens of Example 4, at the time of changing focal length from the wide-angle end to the telephoto end, the first lens group G1 moves toward the object with respect to the image plane, the second lens group G2 moves toward the image, the third lens group G3 moves toward the object, the fourth lens group G4 moves toward the object, the fifth lens group G5 moves toward the object, and the sixth lens group G6 is fixed in the direction along the optical axis.

When an image blur occurs due to a hand-shake etc. at the time of imaging, the cemented lens obtained by cementing the biconcave lens L11 and the object-side convex positive meniscus lens L12 included in the third lens group G3 is defined as the vibration-proof group, the vibration-proof group is moved in a direction generally perpendicular to the optical axis to shift the image, and thus the image blur correction is performed. Note that biconcave lens L11 corresponds to the above-described lens Lvcn and the positive meniscus lens L12 corresponds to the above-described lens Lvcp. Also, the object-side surface of the biconcave lens L11 has an aspherical shape that causes the refractive power to be smaller than the refractive power determined from the paraxial radius of curvature.

(2) Typical Numerical Values

Next, the typical numerical values to which the specific numerical values of the zoom lens are applied will be explained. Table 19 shows the surface data of the zoom lens, and Table 20 shows the specifications of the zoom lens. Note that the 36th and 37th surfaces in Table 19 are the surface data of the cover glass CG.

Table 21 shows the variable interval on the optical axis of the zoom lens at the time of changing focal length and Table 22 shows the variable interval on the optical axis of the zoom lens at the time of focusing. Note that Table 22 shows the values in the case where the shooting distance (imaging distance) is 380.00 mm, 400.00 mm, and 400.00 mm at the wide-angle end, in the intermediate focal length state, and at the telephoto end, respectively. These imaging distances are the shortest imaging distance in each focal length.

Table 23 shows a focal length of each of the lens groups configuring the zoom lens. Table 24 shows an aspherical coefficient of each aspheric surfaces. Also, Table 25 shows the values of the conditional expressions (1) to (18).

Figure 14:
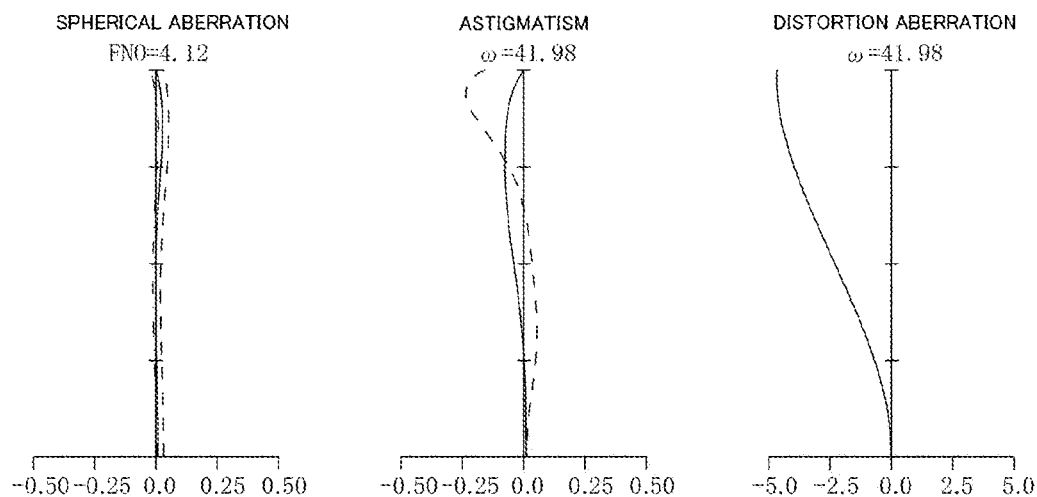
FIG. 14 illustrates a spherical aberration graph, an astigmatism graph, and a distortion graph of the zoom lens of Example 4 at the time of focusing on infinity at the wide-angle end.
Figure 15:
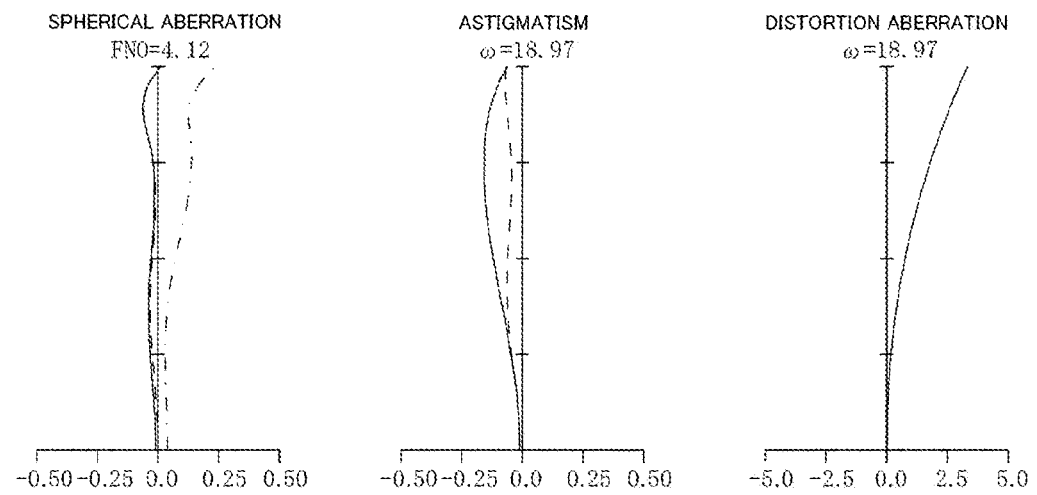
FIG. 15 illustrates a spherical aberration graph, an astigmatism graph, and a distortion graph of the zoom lens of Example 4 at the time of focusing on infinity in an intermediate focal length state.
Figure 16:
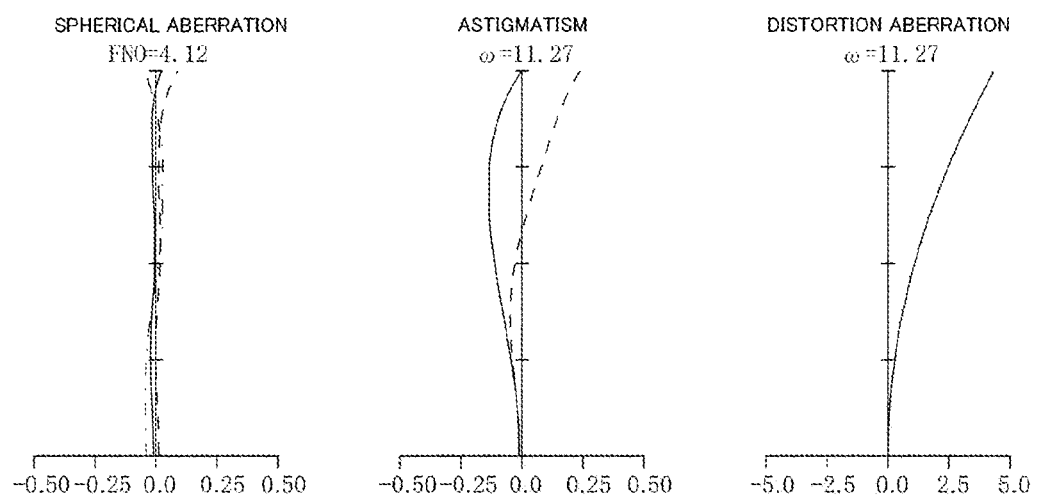
FIG. 16 illustrates a spherical aberration graph, an astigmatism graph, and a distortion graph of the zoom lens of Example 4 at the time of focusing on infinity at the telephoto end.

Also, FIGS. 14 to 16 show the longitudinal aberration diagrams at the time of focusing on infinity at the wide-angle end, in the intermediate focal length state, and at the telephoto end, respectively, of the zoom lens of Example 4.

Further, the backfocus of the zoom lens at the time of focusing on infinity at the wide-angle end is as follows:

$fb$=39.437(mm)

TABLE 19

| Surface Number | | r | d | Nd | vd | H |
|---|---|---|---|---|---|---|
| 1 | | 234.7666 | 1.300 | 2.00069 | 25.46 | 31.000 |
| 2 | | 138.4148 | 5.791 | 1.59282 | 68.62 | 30.558 |
| 3 | | −680.0462 | 0.200 | | | 30.302 |
| 4 | | 69.5724 | 5.230 | 1.59282 | 68.62 | 28.400 |
| 5 | | 161.1477 | D5 | | | 27.926 |
| 6 | ASP | 79.5439 | 1.400 | 1.86791 | 41.50 | 18.481 |
| 7 | | 16.1943 | 8.900 | | | 13.716 |
| 8 | | −318.2547 | 0.800 | 1.87450 | 36.30 | 13.541 |
| 9 | | 45.1827 | 0.309 | | | 13.327 |
| 10 | | 51.2199 | 8.660 | 1.73426 | 26.35 | 13.336 |
| 11 | | −25.6352 | 0.451 | | | 13.228 |
| 12 | ASP | −20.9608 | 1.200 | 1.77115 | 48.40 | 13.152 |

TABLE 19-continued

| Surface Number | | r | d | Nd | vd | H |
|---|---|---|---|---|---|---|
| 13 | ASP | −64.5265 | D13 | | | 13.100 |
| 14 | S | 0.0000 | 1.200 | | | 8.750 |
| 15 | | 53.1982 | 3.548 | 1.69350 | 53.18 | 12.260 |
| 16 | ASP | −79.4200 | 1.520 | | | 12.346 |
| 17 | | −266.2503 | 0.800 | 1.82595 | 41.71 | 12.461 |
| 18 | | 88.0772 | 4.260 | 1.59282 | 68.62 | 12.571 |
| 19 | | −42.6289 | 0.624 | | | 12.691 |
| 20 | ASP | −78.1987 | 0.900 | 1.74974 | 49.75 | 12.900 |
| 21 | | 60.1253 | 2.368 | 1.84666 | 23.78 | 12.727 |
| 22 | | 185.3061 | D22 | | | 12.759 |
| 23 | | 47.5209 | 5.193 | 1.68881 | 54.43 | 13.170 |
| 24 | | −55.0964 | 0.200 | | | 13.066 |
| 25 | | −327.0636 | 0.800 | 1.96229 | 29.86 | 12.625 |
| 26 | | 22.8885 | 6.220 | 1.49700 | 81.61 | 12.075 |
| 27 | | −77.0078 | 0.350 | | | 12.125 |
| 28 | | 73.7860 | 5.020 | 1.61800 | 63.39 | 12.044 |
| 29 | | −73.2609 | D29 | | | 11.750 |
| 30 | | −207.6716 | 2.500 | 1.80809 | 22.76 | 9.380 |
| 31 | | −36.7222 | 0.900 | 1.69350 | 53.18 | 9.429 |
| 32 | ASP | 22.1640 | D32 | | | 9.493 |
| 33 | | 52.7180 | 6.495 | 1.59282 | 68.62 | 15.993 |
| 34 | | −73.2205 | 0.800 | 1.69206 | 30.32 | 16.171 |
| 35 | | −416.6667 | 37.118 | | | 16.374 |
| 36 | | 0.0000 | 2.000 | 1.51680 | 64.20 | 21.005 |
| 37 | | 0.0000 | 1.000 | | | 21.342 |

TABLE 20

| | | | |
|---|---|---|---|
| f | 24.839 | 59.958 | 102.474 |
| Fno | 4.121 | 4.119 | 4.120 |
| ω | 41.981 | 18.973 | 11.267 |
| Y | 21.633 | 21.633 | 21.633 |
| TL | 169.752 | 174.603 | 207.241 |

TABLE 21

| | | | |
|---|---|---|---|
| f | 24.839 | 59.958 | 102.474 |
| Shooting Distance | INF | INF | INF |
| D5 | 1.000 | 20.275 | 53.597 |
| D13 | 38.216 | 6.180 | 1.360 |
| D22 | 4.143 | 3.278 | 2.700 |
| D29 | 1.179 | 12.168 | 13.313 |
| D32 | 7.156 | 14.643 | 18.212 |

TABLE 22

| | | | |
|---|---|---|---|
| Shooting Distance | 380.000 | 400.000 | 400.000 |
| D29 | 1.849 | 15.198 | 20.630 |
| D32 | 6.486 | 11.613 | 10.895 |

TABLE 23

| Group | Surface Number | Focal Length |
|---|---|---|
| G1 | 1-5 | 140.430 |
| G2 | 6-13 | −21.836 |
| G3 | 14-22 | 56.376 |
| G4 | 23-29 | 39.322 |
| G5 | 30-32 | −31.033 |
| G6 | 33-37 | 86.738 |

TABLE 24

| Surface Number | K | A4 | A6 | A8 | A10 | A12 |
|---|---|---|---|---|---|---|
| 6 | 0 | −3.5121E−07 | 1.2475E−09 | −1.8924E−11 | 2.0318E−14 | −9.3027E−18 |
| 12 | 0 | 3.4527E−05 | −2.8731E−07 | 2.1583E−09 | −7.5699E−12 | 1.1133E−14 |
| 13 | 0 | 1.8666E−05 | −3.0289E−07 | 2.0678E−09 | −7.5735E−12 | 1.0314E−14 |
| 16 | 0 | 1.3999E−05 | −4.6523E−09 | 4.5363E−11 | −3.1634E−13 | 9.7102E−16 |
| 20 | 0 | 2.6081E−06 | −9.1362E−09 | 6.1882E−11 | −2.3937E−13 | 3.9842E−16 |
| 32 | 0 | −4.4734E−06 | 3.3579E−09 | −4.8480E−10 | 4.0227E−12 | −1.3728E−14 |

TABLE 25

| | | Example 1 | Example 2 | Example 3 | Example 4 |
|---|---|---|---|---|---|
| Conditional expression (1) | Cr1f/fw | 6.677 | 35.830 | 12.572 | 9.452 |
| Conditional expression (2) | (−ffw + Dfrw)/FBw | 1.714 | 1.901 | 1.422 | 1.703 |
| Conditional expression (3) | $1/|(1/vdLvcn) - (1/vdLvcp)|$ | 46.591 | 37.770 | 24.364 | 45.555 |
| Conditional expression (4) | $|(1 - \beta vct) \times \beta vctr|$ | 1.194 | 4.004 | 1.682 | 1.198 |
| Conditional expression (5) | (Crff + Crfr)/(Crff − Crfr) | 0.713 | 0.191 | 0.717 | 0.807 |
| Conditional expression (6) | $|\{1 - (\beta ft^2)\} \times \beta ftr^2|$ | 5.419 | 4.437 | 5.061 | 4.609 |
| Conditional expression (6-1) | $|\beta ft|$ | 3.756 | 5.520 | 5.034 | 4.451 |
| Conditional expression (7) | $|fw \times \tan\omega w|/(fsr - FBw)$ | −0.197 | −0.141 | −0.029 | −0.017 |
| Conditional expression (8) | NdLrn | 1.971 | 1.847 | 2.001 | 1.962 |

TABLE 25-continued

|  |  | Example 1 | Example 2 | Example 3 | Example 4 |
|---|---|---|---|---|---|
| Conditional expression (9) | ΔPgF | 0.000 | 0.014 | 0.004 | 0.000 |
| Conditional expression (9-1) | ΔPgFp | 0.038 | 0.038 | 0.019 | 0.038 |
| Conditional expression (10) | fn/fw | −0.861 | −1.544 | −0.815 | −0.879 |
| Conditional expression (11) | ff/ft | −0.307 | −0.426 | −0.416 | −0.303 |
| Conditional expression (12) | vdLn | 53.186 | 46.503 | 67.023 | 53.186 |
| Conditional expression (13) | \|X1\|/ft | 0.369 | 0.260 | 0.525 | 0.366 |
| Conditional expression (14) | Crrf/ft | 0.433 | 0.516 | 0.329 | 0.519 |
| Conditional expression (15) | ffft/ft | 0.414 | 0.467 | 0.435 | 0.454 |
| Conditional expression (16) | Drfrt/ft | 0.186 | 0.140 | 0.199 | 0.178 |
| Conditional expression (17) | fw/ffw | −0.920 | −0.648 | −0.900 | −0.895 |
| Conditional expression (18) | vdLp | 22.761 | 23.785 | 17.980 | 22.761 |

According to the present invention, it is made possible to provide a standard zoom lens having a high optical performance while reducing the weight of the focus group and the vibration-proof group, and an imaging apparatus including the zoom lens. In particular, the zoom lens is suitable as a zoom lens having a half image viewing angle (ω) at the wide-angle end being larger than 24° while including a focal length of 50 millimeters in the zoom range in terms of 35-mm format.

REFERENCE SIGNS LIST

G1: first lens group
G2: second lens group
G3: third lens group
G4: fourth lens group
G5: fifth lens group
G6: sixth lens group
F: focus group
S: aperture stop
CG: cover glass
IMG: image forming plane

What is claimed is:

1. A zoom lens comprising a front group and a rear group, wherein a group including at least one lens group arranged on an object side of a widest air interval at a wide-angle end is defined as the front group and a group including at least one lens group arranged on an image side of the widest air interval at the wide-angle end is defined as the rear group,
the front group having a negative refractive power, the rear group having a positive refractive power,
the zoom lens configured to change focal length from the wide-angle end to a telephoto end by changing an air interval between the lens groups such that at least an air interval between the front group and the rear group is reduced, the zoom lens further comprising:
a focus group arranged in the rear group and configured to move in a direction along an optical axis at the time of focusing from infinity to a close object; and
a vibration-proof group arranged to be closer to the object side than the focus group and configured to be movable in a direction generally perpendicular to the optical axis, wherein
the following conditional expressions are satisfied:

$$5.10 < Cr1f/fw \qquad (1)$$

$$0.50 < (-ffw + Dfrw)/FBw < 2.00 \qquad (2)$$

$$0.00 < (Crff + Crfr)/(Crff - Crfr) < 5.00 \qquad (5)$$

where
Cr1f denotes a radius of curvature of the surface closest to the object side of the zoom lens,
fw denotes a focal length of the zoom lens at the wide-angle end,
ffw denotes a composite focal length of the front group at the wide-angle end,
Dfrw denotes a distance on an optical axis between the surface closest to the image side of the front group and the surface closet to the object side of the rear group at the wide-angle end,
FBw denotes an air conversion length from the surface closest to the image side of the zoom lens to an image forming plane at the wide-angle end,
Crff denotes a radius of curvature of the surface closest to the object side of the focus group, and
Crfr denotes a radius of curvature of the surface closest to the image side of the focus group.

2. The zoom lens according to claim 1, wherein the vibration-proof group has at least one lens Lvcn having a negative refractive power and at least one lens Lvcp having a positive refractive power, and
the following conditional expression is satisfied:

$$22.00 < 1/|(1/vdLvcn) - (1/vdLvcp)| < 70.00 \qquad (3)$$

where
vdLvcn denotes an Abbe number on a d-line of the lens Lvcn, and
vdLvcp denotes an Abbe number on a d-line of the lens Lvcp.

3. The zoom lens according to claim 2, wherein at least any one of the lenses Lvcn and at least any one of the lenses Lvcp are cemented.

4. The zoom lens according to claim 1, wherein
the vibration-proof group has at least one aspherical surface, the aspherical surface having an aspherical shape such that a refractive power is weaker than a refractive power obtained from a paraxial curvature thereof.

5. The zoom lens according to claim 1, wherein the following conditional expression is satisfied:

$$0.50<|1-(\beta vct)\times\beta vctr|<6.00 \qquad (4)$$

where

βvct denotes a lateral magnification of the vibration-proof group at a time of focusing on infinity at a telephoto end, and βvctr denotes a composite lateral magnification of all of one or more lenses arranged closer to the image side than the vibration-proof group at the time of focusing on infinity at the telephoto end.

6. The zoom lens according to claim 1, wherein the vibration-proof group is included within the rear group.

7. The zoom lens according to claim 1, wherein the vibration-proof group is composed of one single lens unit.

8. The zoom lens according to claim 1, wherein the following conditional expression is satisfied:

$$1.20<|\{1-(\beta ft\times\beta ft)\}\times\beta ftr\times\beta ftrl|<15.00 \qquad (6)$$

where

βaft denotes a lateral magnification of the focus group at the time of focusing on infinity at the telephoto end, and βftr denotes a composite lateral magnification of all of one or more lenses arranged to be closer to the image side than the focus group at the time of focusing on infinity at the telephoto end.

9. The zoom lens according to claim 1, wherein the rear group has at least one lens closer to the image side than the focus group.

10. The zoom lens according to claim 9, wherein the rear group has at least one lens surface Sr having a negative refractive power and arranged to be closer to the image side than the focus group, and the following conditional expression is satisfied:

$$-0.400<|fw\times\tan \omega wl/(fsr-FBw)<-0.002 \qquad (7)$$

where

ωw denotes a half image viewing angle of the most off-axis principal ray of the zoom lens at the wide-angle end, and fsr denotes a focal length of the lens surface Sr.

11. The zoom lens according to claim 1, wherein the rear group has at least one lens Lrn having a negative refractive power and arranged to be closer to the object side than the focus group, and the following conditional expression is satisfied:

$$1.84<NdLrn<2.10 \qquad (8)$$

where NdLrn denotes the refractive index on the d-line of the lens Lrn.

12. The zoom lens according to claim 1, wherein the rear group has at least one lens Lrn having a negative refractive power and arranged to be closer to the object side than the focus group, and the following conditional expression is satisfied:

$$-0.015<\Delta PgF<0.022 \qquad (9)$$

where

ΔPgF denotes a deviation of a partial dispersion ratio from a reference line in a coordinate system with the partial dispersion ratio on the vertical axis and an Abbe number vd on the d-line on the horizontal axis, where the line passing through the coordinates of the glass material C7 at which the partial dispersion ratio is 0.5393 and vd is 60.49 and passing through the coordinates of the glass material F2 at which the partial dispersion ratio is 0.5829 and vd is 36.30 is defined as the reference line.

13. The zoom lens according to claim 1, wherein the front group has at least one lens group having a negative refractive power, a lens group having a largest negative refractive power in the front group being a negative lens group n, and the following conditional expression is satisfied:

$$-2.00<fn/fw<-0.55 \qquad (10)$$

where fn denotes a focal length of the negative lens group n, and fw denotes a focal length of the zoom lens at the wide-angle end.

14. The zoom lens according to claim 1, wherein the focus group has a negative refractive power.

15. The zoom lens according to claim 1, wherein the following conditional expression is satisfied:

$$-0.70<ff/ft<-0.05 \qquad (11)$$

where ff represents a focal length of the focus group, and ft denotes a focal length of the zoom lens at the telephoto end.

16. The zoom lens according to claim 1, wherein the focus group has at least one lens Ln having a negative refractive power, and the following conditional expression is satisfied:

$$45.0<vdLn<98.0 \qquad (12)$$

where vdLn denotes Abbe number on the d-line of the lens Ln.

17. The zoom lens according to claim 1, wherein the lens group arranged to be closest to the object side in the front group is a first lens group, and the first lens group moves in the direction along the optical axis w at a time of changing focal length from the wide-angle end to the telephoto end.

18. The zoom lens according to claim 17, wherein the following conditional expression is satisfied:

$$0.01<|X1|/ft<0.65 \qquad (13)$$

where

X1 denotes an movement distance by which the first lens group moves from the position closest to the image side where the first lens group can be positioned to the position closest to the object side at a time of changing focal length from the wide-angle end to the telephoto end, and ft denotes a focal length of the zoom lens at the telephoto end.

19. The zoom lens according to claim 1, wherein the following conditional expression is satisfied:

$$0.01<Crrf/ft \qquad (14)$$

where

Crrf denotes a radius of curvature of the surface closest to the object side of the rear group, and ft denotes a focal length of the zoom lens at the telephoto end.

20. The zoom lens according to claim 1, wherein the following conditional expression is satisfied:

$$0.10<ffft/ft<1.00 \qquad (15)$$

where ffft denotes a composite focal length of all of one or more lenses arranged to be closer to the object side than the focus group at the telephoto end, and ft denotes a focal length of the zoom lens at the telephoto end.

21. The zoom lens according to claim 1, wherein the following conditional expression is satisfied, wherein a lens surface arranged to be closest to the focus group in a direction in which the focus group moves at a time of focusing from infinity to the close object is a lens surface Lnf:

$$0.015 < Drfrt/ft < 1.000 \quad (16)$$

where

Drfrt denotes a distance on the optical axis between the focus group and the lens surface Lnf at a time of focusing on infinity at the telephoto end, and ft denotes a focal length of the zoom lens at the telephoto end.

22. The zoom lens according to claim 1, wherein a shortest imaging distance at the wide-angle end is shorter than a shortest imaging distance at the telephoto end.

23. The zoom lens according to claim 1, wherein the following conditional expression is satisfied:

$$-1.50 < fw/ffw < -0.50 \quad (17)$$

where fw denotes a focal length of the zoom lens at the wide-angle end.

24. An imaging apparatus comprising:

the zoom lens according to claim 1; and an image sensor, on the image side of the zoom lens, configured to convert an optical image formed by the zoom lens into an electrical signal.

* * * * *

UNITED STATES PATENT AND TRADEMARK OFFICE
CERTIFICATE OF CORRECTION

PATENT NO. : 10,935,772 B2
APPLICATION NO. : 16/222268
DATED : March 2, 2021
INVENTOR(S) : Yoshito Iwasawa et al.

Page 1 of 1

It is certified that error appears in the above-identified patent and that said Letters Patent is hereby corrected as shown below:

In the Claims

Column 44, Line 30, Claim 1, delete "/(Crff–Crfr)" and insert -- /(Crff - Crfr) --

Column 44, Line 55, Claim 2, delete "22.00<1/I(1" and insert -- 22.00<1/|(1 --

Column 44, Line 55, Claim 2, delete "I<70.00" and insert -- |<70.00 --

Column 45, Line 6, Claim 5, delete "0.50<1(1–(β$vct$)×β$vctrl$<6.00" and insert -- 0.50 < |(1 - βvct) × βvctrl < 6.00 --

Column 45, Line 22, Claim 8, delete "1{1-(βft×βft)}×βftr×βftrl" and insert -- |{1–(βft×βft)}×βftr×βftr| --

Column 45, Line 24, Claim 8, delete "βaft" and insert -- βft --

Column 45, Line 38, Claim 10, delete "Ifw×tan ωwl/(fsr–FBw)" and insert -- |fw×tanωw|/(fsr - FBw) --

Column 46, Line 38, Claim 18, delete "IX1l/ft" and insert -- |X1|/ft --

Signed and Sealed this
Third Day of August, 2021

Drew Hirshfeld
*Performing the Functions and Duties of the*
*Under Secretary of Commerce for Intellectual Property and*
*Director of the United States Patent and Trademark Office*